US012549037B2

(12) United States Patent
Kim

(10) Patent No.: US 12,549,037 B2
(45) Date of Patent: Feb. 10, 2026

(54) METHOD FOR DETECTING FOREIGN MATERIAL OF WIRELESS POWER TRANSMISSION APPARATUS

(71) Applicant: Samsung Electronics Co., Ltd., Suwon-si (KR)

(72) Inventor: Yusu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/768,749

(22) Filed: Jul. 10, 2024

(65) Prior Publication Data

US 2024/0364140 A1 Oct. 31, 2024

Related U.S. Application Data

(63) Continuation of application No. PCT/KR2022/019360, filed on Dec. 1, 2022.

(30) Foreign Application Priority Data

Jan. 25, 2022 (KR) ........................ 10-2022-0010491
May 23, 2022 (KR) ........................ 10-2022-0063099

(51) Int. Cl.
*H02J 50/60* (2016.01)
*H02J 7/00* (2006.01)
(Continued)

(52) U.S. Cl.
CPC .......... *H02J 50/60* (2016.02); *H02J 7/00712* (2020.01); *H02J 50/12* (2016.02); *H02J 50/80* (2016.02); *H02J 2207/20* (2020.01)

(58) Field of Classification Search
CPC ........ H02J 50/60; H02J 7/00712; H02J 50/12; H02J 50/80; H02J 2207/20; H02J 7/02;
(Continued)

(56) References Cited

U.S. PATENT DOCUMENTS 9,553,485 B2 1/2017 Singh et al.
10,331,259 B2 6/2019 Hotelling et al.
(Continued)

FOREIGN PATENT DOCUMENTS

KR 10-2014-0113147 A 9/2014
KR 10-2018-0021908 A 3/2018
(Continued)

OTHER PUBLICATIONS

Sunhee Kim et al., A Novel Metal Foreign Object Detection for Wireless High-Power Transfer Using a Two-Layer Balanced Coil Array with a Serial-Resonance Maxwell Bridge, Dec. 4, 2020.
(Continued)

*Primary Examiner* — Rexford N Barnie
*Assistant Examiner* — Terrence R Willoughby
(74) *Attorney, Agent, or Firm* — Jefferson IP Law, LLP

(57) ABSTRACT

A wireless power transmission apparatus is provided. The apparatus includes a converter configured to perform a DC/DC power conversion operation, an inverter connected to the converter and configured to perform an AC/DC power conversion operation, a coil connected to the inverter, memory storing one or more computer programs, and one or more processors communicatively coupled to the converter, the inverter, the coil, and the memory, wherein the one or more computer programs include computer-executable instructions that, when executed by the one or more processors individually or collectively, cause the wireless power transmission device to control the inverter to transmit first power of a first frequency through the coil, compare a first current input to the inverter through the converter with a reference value while the first power is transmitted, identify whether a packet from the outside is identified based on the first current being greater than the reference value, control the inverter to transmit second power having a second (Continued)

frequency lower than the first frequency through the coil based on the packet not being identified while the first power is transmitted, identify whether the packet is identified based on the second current being larger than the reference value, and identify that a foreign material is present, based on the packet not being identified while the second power is transmitted.

20 Claims, 7 Drawing Sheets

(51) Int. Cl.
*H02J 50/12* (2016.01)
*H02J 50/80* (2016.01)

(58) Field of Classification Search
CPC ..... H02J 50/10; G01R 19/165; H04B 17/318; B60L 53/124; G01V 3/10
See application file for complete search history.

(56) References Cited

U.S. PATENT DOCUMENTS

| | | | | |
|---|---|---|---|---|
| 11,056,931 | B2 | 7/2021 | Park et al. | |
| 11,086,042 | B2 | 8/2021 | Park et al. | |
| 2014/0266036 | A1 | 9/2014 | Jung et al. | |
| 2018/0205269 | A1 | 7/2018 | Han et al. | |
| 2019/0310388 | A1* | 10/2019 | Park | G01N 27/20 |
| 2019/0326786 | A1 | 10/2019 | Kim et al. | |
| 2020/0266670 | A1 | 8/2020 | Ha et al. | |
| 2020/0328629 | A1 | 10/2020 | Kim et al. | |
| 2021/0249913 | A1 | 8/2021 | Ha et al. | |
| 2023/0124614 | A1 | 4/2023 | Shichino | |
| 2023/0246483 | A1 | 8/2023 | Park | |

FOREIGN PATENT DOCUMENTS

| | | | |
|---|---|---|---|
| KR | 10-1896461 | B1 | 9/2018 |
| KR | 10-2018-0117512 | A | 10/2018 |
| KR | 10-2019-0083454 | A | 7/2019 |
| KR | 10-2020-0101035 | A | 8/2020 |
| KR | 10-2021-0000334 | A | 1/2021 |
| KR | 10-2021-0101525 | A | 8/2021 |
| KR | 10-2021-0128607 | A | 10/2021 |
| KR | 10-2022-0002845 | A | 1/2022 |
| WO | 2017/217663 | A1 | 12/2017 |
| WO | 2021/161760 | A1 | 8/2021 |
| WO | 2021/235908 | A1 | 11/2021 |

OTHER PUBLICATIONS

Neil Kuyvenhoven et al., Development of a Foreign Object Detection and Analysis Method for Wireless Power Systems, Dec. 1, 2011.

International Search Report dated Mar. 9, 2023, issued in International Application No. PCT/KR2022/019360.

* cited by examiner

METHOD FOR DETECTING FOREIGN MATERIAL OF WIRELESS POWER TRANSMISSION APPARATUS

CROSS-REFERENCE TO RELATED APPLICATION(S)

This application is a continuation application, claiming priority under § 365 (c), of an International application No. PCT/KR2022/019360, filed on Dec. 1, 2022, which is based on and claims the benefit of a Korean patent application number 10-2022-0010491, filed on Jan. 25, 2022, in the Korean Intellectual Property Office, and of a Korean patent application number 10-2022-0063099, filed on May 23, 2022, in the Korean Intellectual Property Office, the disclosure of each of which is incorporated by reference herein in its entirety.

BACKGROUND

1. Field

The disclosure relates to a method for detecting a foreign object of a wireless power transmission device.

2. Description of Related Art

The wireless power transmission technology using the magnetic induction scheme is a scheme for transferring power by the electromagnetic field induced in the coil. The wireless power transmission device applies a current to the transmission coil to generate an electromagnetic field, and an induced electromotive force is formed in the reception coil of the wireless power reception device, so that power may be wirelessly transmitted.

The wireless power reception device may perform in-band communication while wirelessly receiving power from the wireless power transmission device. The wireless power reception device may provide information to the wireless power transmission device by performing in-band communication. For example, the wireless power reception device may perform in-band communication based on an amplitude shift keying (ASK) modulation scheme. At least one additional element may be selectively connected to the resonance circuit of the wireless power reception device through a switch, and the wireless power reception device may perform modulation by controlling the on/off state of the switch. Depending on the modulation in the wireless power reception device, the amplitude of the current and/or voltage applied to the transmission coil of the wireless power transmission device may be changed. The wireless power transmission device may identify information provided by the wireless power reception device by demodulating and/or decoding information about the amplitude of the current and/or voltage applied to the transmission coil.

The above information is presented as background information only to assist with an understanding of the disclosure. No determination has been made, and no assertion is made, as to whether any of the above might be applicable as prior art with regard to the disclosure.

SUMMARY

When a foreign object is present on the wireless power transmission device, the foreign object may reduce wireless power transmission efficiency by the wireless power transmission device or damage the wireless power transmission device.

Accordingly, there is a need for a technology for detecting an object present on the wireless power transmission device and determining whether the object is a power transmission target.

Aspects of the disclosure are to address at least the above-mentioned problems and/or disadvantages and to provide at least the advantages described below. Accordingly, an aspect of the disclosure is to provide a method for detecting a foreign object of a wireless power transmission device that transmits power (e.g., a ping signal) for detecting an external object and detects a foreign object based on whether a packet is received from the outside.

Additional aspects will be set forth in part in the description which follows and, in part, will be apparent from the description, or may be learned by practice of the presented embodiments.

In accordance with an aspect of the disclosure, a wireless power transmission device is provided. The device includes a converter configured to perform a DC/DC power conversion operation, an inverter connected to the converter and configured to perform an AC/DC power conversion operation, a coil connected to the inverter, memory storing one or more computer programs, and one or more one or more processors communicatively coupled to the converter, the inverter, the coil, and the memory, wherein the one or more computer programs include computer-executable instructions that, when executed by the one or more processors individually or collectively, cause the wireless power transmission device to control an inverter of the wireless power transmission device to transmit first power of a first frequency through a coil of the wireless power transmission device, compare a first current input to the inverter through the converter with a reference value while the first power is transmitted, identify whether a packet from an outside is identified based on the first current being larger than the reference value, control the inverter to transmit second power of a second frequency lower than the first frequency through the coil based on the packet not being identified while the first power is transmitted, compare a second current input to the inverter through the converter with the reference value while the second power is transmitted, identify whether the packet is identified based on the second current being larger than the reference value, and identify that a foreign object is present, based on the packet not being identified while the second power is transmitted.

In accordance with another aspect of the disclosure, a method for operating a wireless power transmission device is provided. The method includes controlling an inverter of the wireless power transmission device to transmit first power of a first frequency through a coil of the wireless power transmission device, comparing a first current input to the inverter through a converter of the wireless power transmission device with a reference value while the first power is transmitted, identifying whether a packet from an outside is identified based on the first current being larger than the reference value, controlling the inverter to transmit second power of a second frequency lower than the first frequency through the coil based on the packet not being identified while the first power is transmitted, comparing a second current input to the inverter through the converter with the reference value while the second power is transmitted, identifying whether the packet is identified based on the second current being larger than the reference value, and identifying that a foreign object is present, based on the packet not being identified while the second power is transmitted.

In accordance with another aspect of the present invention, one or more non-transitory computer-readable storage media storing one or more computer programs including computer-executable instructions that, when executed by one or more processors of a wireless power transmission device individually or collectively, cause the wireless power transmission device to perform operations are provided. The operations include controlling an inverter of the wireless power transmission device to transmit first power of a first frequency through a coil of the wireless power transmission device; comparing a first current input to the inverter through a converter of the wireless power transmission device with a reference value while the first power is transmitted; identifying whether a packet from an outside is identified based on the first current being larger than the reference value; controlling the inverter to transmit second power of a second frequency lower than the first frequency through the coil based on the packet not being identified while the first power is transmitted; comparing a second current input to the inverter through the converter with the reference value while the second power is transmitted; identifying whether the packet is identified based on the second current being larger than the reference value; and identifying that a foreign object is present, based on the packet not being identified while the second power is transmitted.

A method for detecting a foreign object of a wireless power transmission device transmits power (e.g., a ping signal) for detecting an external object and detect a foreign object based on whether a packet is received from the outside.

Accordingly, it is possible to prevent a reduction in wireless power transmission efficiency and damage to the wireless power transmission device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
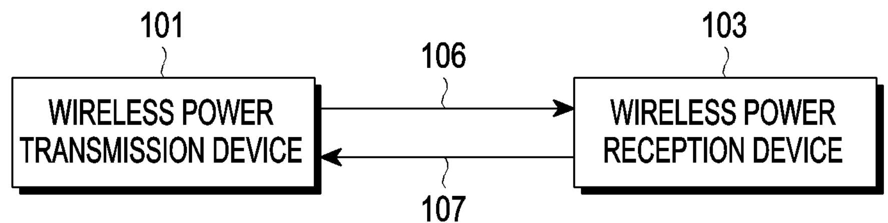
FIG. 1 is a block diagram illustrating a wireless power transmission device and a wireless power reception device according to an embodiment of the disclosure.

FIG. 1 is a block diagram illustrating a wireless power transmission device and a wireless power reception device according to an embodiment of the disclosure.

Referring to FIG. 1, a wireless power transmission device 101 according to an embodiment may wirelessly transmit power 106 to a wireless power reception device 103. Or, the wireless power transmission device 101 may receive information 107 from the wireless power reception device 103. For example, the wireless power transmission device 101 may transmit power 106 as per an induction scheme. Adopting the induction scheme, the wireless power transmission device 101 may include at least one of, e.g., a power source, a DC-DC conversion circuit (e.g., DC/DC converter), DC-AC conversion circuit (e.g., inverter), an amplifying circuit, an impedance matching circuit, at least one capacitor, at least one coil, or a communication modulation circuit. The at least one capacitor together with the at least one coil may constitute a resonance circuit. The wireless power transmission device 101 may implement at least part of the schemes defined in the wireless power consortium (WPC) Qi standard. The wireless power transmission device 101 may include a coil that is capable of produce a magnetic field when letting an electric current flow thereacross by an induction scheme. The process of the wireless power transmission device 101 producing an induced magnetic field may be represented as the wireless power transmission device 101 wirelessly transmitting the power 106. Further, an induced electromotive force (or current, voltage, and/or power) may be generated by the magnetic field generated around the coil of the wireless power reception device 103 according to a resonance scheme or an induction scheme. The process of producing an induced electromotive force through the coil may be represented as the 'wireless power reception device 103 wirelessly receives the power 106.'

The wireless power transmission device 101 according to an embodiment may communicate with the wireless power reception device 103. For example, the wireless power transmission device 101 may communicate with the wireless power reception device 103 according to an in-band scheme. The wireless power transmission device 101 may modulate data to be transmitted according to, e.g., a frequency shift keying (FSK) modulation scheme, and the wireless power reception device 103 may perform modulation according to an amplitude shift keying (ASK) modulation scheme, thereby providing information 107. The wireless power transmission device 101 may identify the information 107 provided by the wireless power reception device 103 based on the amplitude of the current and/or voltage applied to the transmission coil. In FIG. 1, the wireless power reception device 103 is shown as directly transmitting the information 107 to the wireless power transmission device 101, but this is merely for an easy understanding, and it will be appreciated by one of ordinary skill in the art that that the wireless power reception device 103 only controls on/off of at least one switch therein. The operation of performing modulation based on an ASK modulation scheme and/or FSK modulation scheme may be understood as the operation of transmitting data (or packets) according to the in-band communication scheme, and the operation of performing demodulation based on the ASK demodulation scheme and/or FSK demodulation scheme may be understood as the operation of receiving data (or packets) according to the in-band communication scheme.

In the disclosure, that the wireless power transmission device 101 or the wireless power reception device 103 performs a specific operation may mean that various pieces of hardware included in the wireless power transmission device 101 or the wireless power reception device 103, e.g., a controller (e.g., a micro-controlling unit (MCU), a field programmable gate array (FPGA), an application specific integrated circuit (ASIC), a microprocessor, or an application processor (AP)) performs the specific operation. Or, that the wireless power transmission device 101 or the wireless power reception device 103 performs a specific operation may also mean that the connector controls another hardware device to perform the specific operation. That the wireless power transmission device 101 or the wireless power reception device 103 performs a specific operation may mean that the controller or another hardware device triggers the specific operation as an instruction for performing the specific operation, which is stored in a storage circuit (e.g., memory) of the wireless power transmission device 101 or the wireless power reception device 195, is executed.

Figure 2:
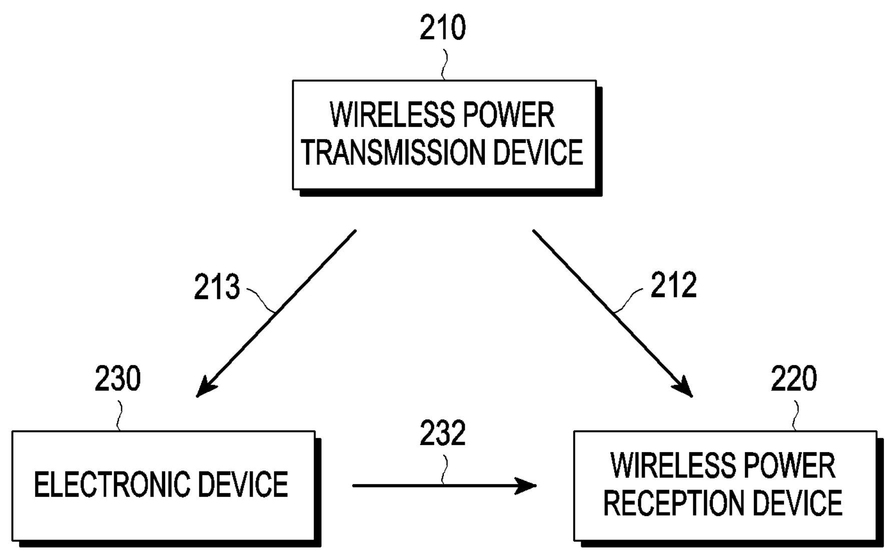
FIG. 2 is a view illustrating a device included in a wireless power transmission system, according to an embodiment of the disclosure.

FIG. 2 is a view illustrating a device included in a wireless power transmission system, according to an embodiment of the disclosure.

The wireless power transmission device 210 of FIG. 2 may be the wireless power transmission device 101 of FIG. 1. The wireless power reception device 220 of FIG. 2 may be the wireless power reception device 103 of FIG. 1. The wireless power transmission device 210 may transmit wireless power 212 to the wireless power reception device 220.

The electronic device 230 of FIG. 2 may be a device capable of operating as a wireless power transmission device (e.g., the wireless power transmission device 101 of FIG. 1) or as a wireless power reception device (e.g., the wireless power reception device 103 of FIG. 1).

According to an embodiment, the electronic device 230, as a wireless power reception device, may receive wireless power from the wireless power transmission device 210. In this case, the description of the wireless power reception device 103 may be applied to the electronic device 230.

According to an embodiment, the electronic device 230, as a wireless power transmission device, may transmit wireless power 232 to the wireless power reception device 220. In this case, the description of the wireless power transmission device 101 may be applied to the electronic device 230.

The coil included in the electronic device 230 may be used as a reception coil as the electronic device 230 operates as a wireless power reception device, or may be used as a transmission coil as the electronic device 230 operates as a wireless power transmission device.

An AC-DC conversion circuit (e.g., an inverter or a rectifier) included in the electronic device 230 may be used as a rectifier as the electronic device 230 operates as a wireless power reception device, or may be used as an inverter as the electronic device 230 operates as a wireless power transmission device.

The DC-DC conversion circuit (e.g., DC/DC converter) included in the electronic device 230 may be used as a reception converter as the electronic device 230 operates as a wireless power reception device, or may be used as a transmission converter as the electronic device 230 operates as a wireless power transmission device.

Other components included in the electronic device 230 may also operate for reception as the electronic device 230 operates as a wireless power reception device, and may operate for transmission as the electronic device 230 operates as a wireless power transmission device.

Figure 3:
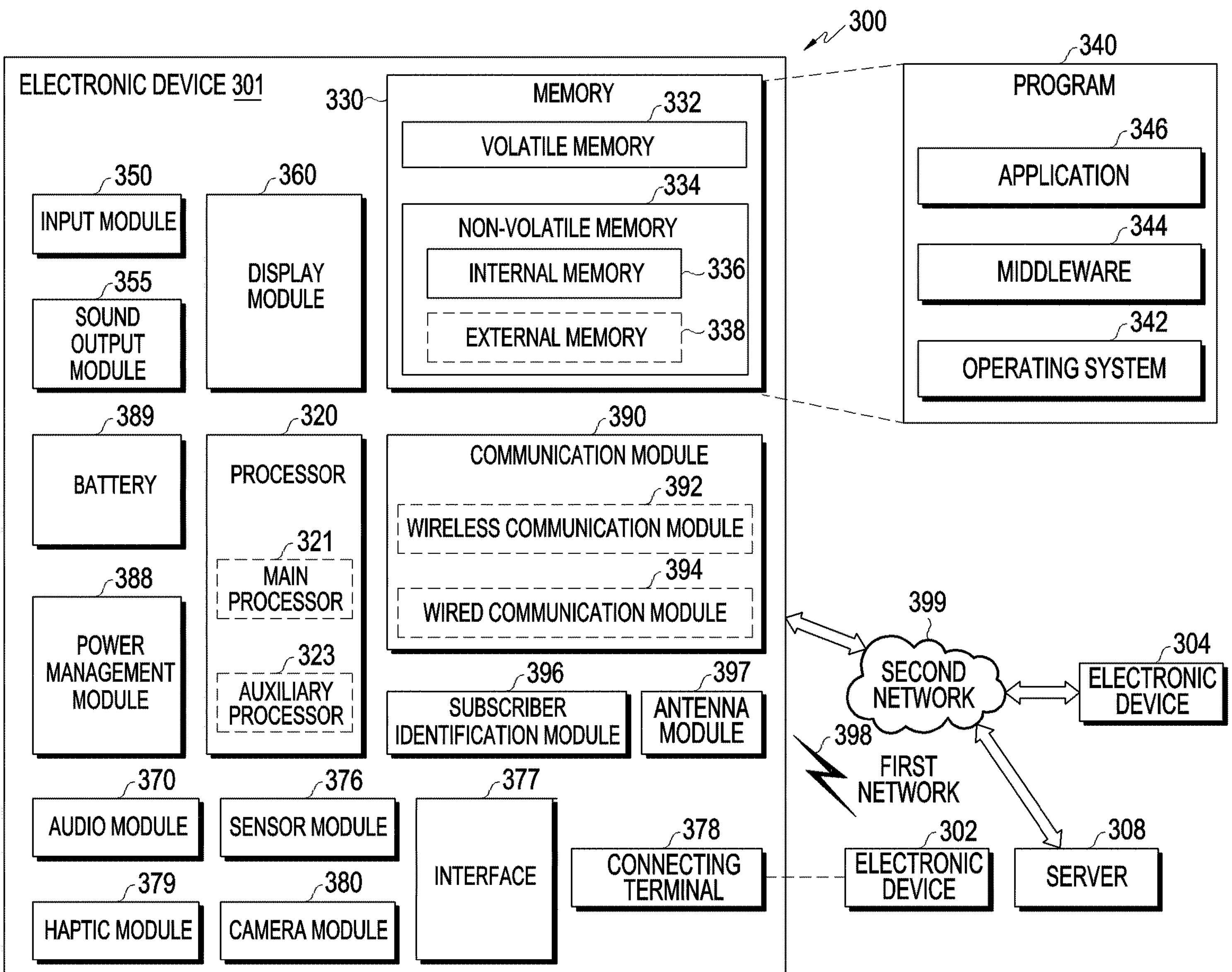
FIG. 3 is a block diagram illustrating an electronic device in a network environment according to an embodiment of the disclosure.

According to an embodiment, the electronic device 230 may be the electronic device 301 of FIG. 3.

FIG. 3 is a block diagram illustrating an electronic device 301 in a network environment 300 according to an embodiment of the disclosure.

Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In an embodiment, at least one (e.g., the connecting terminal 378) of the components may be omitted from the electronic device 301, or one or more other components may be added in the electronic device 101. According to an embodiment, some (e.g., the sensor module 376, the camera module 380, or the antenna module 397) of the components may be integrated into a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to an embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 301 includes the main processor 321 and the auxiliary processor 323, the auxiliary processor 323 may be configured to use lower power than the main processor 321 or to be specified for a designated function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 123. According to an embodiment, the auxiliary processor 323 (e.g., the neural processing unit) may include a hardware structure specified for artificial intelligence model processing. The artificial intelligence model may be generated via machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by other component (e.g., the processor 320) of the electronic device 301, from the outside (e.g., a user) of the electronic device 301. The input module 350 may include, for example, a microphone, a mouse, a keyboard, keys (e.g., buttons), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display 360 may include, for example, a display, a hologram device, or a projector and control circuitry to control a corresponding one of the display, hologram device, and projector. According to an embodiment, the display 360 may include a touch sensor configured to detect a touch, or a pressure sensor configured to measure the intensity of a force generated by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 101, and then generate an electrical signal or data value corresponding to the detected state. According to an embodiment, the sensor module 376 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or motion) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device 304 via a first network 398 (e.g., a short-range communication network, such as Bluetooth™, wireless-fidelity (Wi-Fi) direct, or infrared data association (IrDA)) or a second network 399 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 392 may identify or authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device). According to an embodiment, the antenna module 397 may include one antenna including a radiator formed of a conductor or conductive pattern formed on a substrate (e.g., a printed circuit board (PCB)). According to an embodiment, the antenna module 397 may include a plurality of antennas (e.g., an antenna array). In this case, at least one antenna appropriate for a communication scheme used in a communication network, such as the first network 398 or the second network 399, may be selected from the plurality of antennas by, e.g., the communication module 390. The signal or the power may then be transmitted or received between the communication module 390 and the external electronic device via the selected at least one antenna. According to an embodiment, other parts (e.g., radio frequency integrated circuit (RFIC)) than the radiator may be further formed as part of the antenna module 397.

According to an embodiment, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. The external electronic devices 302 or 304 each may be a device of the same or a different type from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an Internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or health-care) based on 5G communication technology or IoT-related technology.

Figure 4:
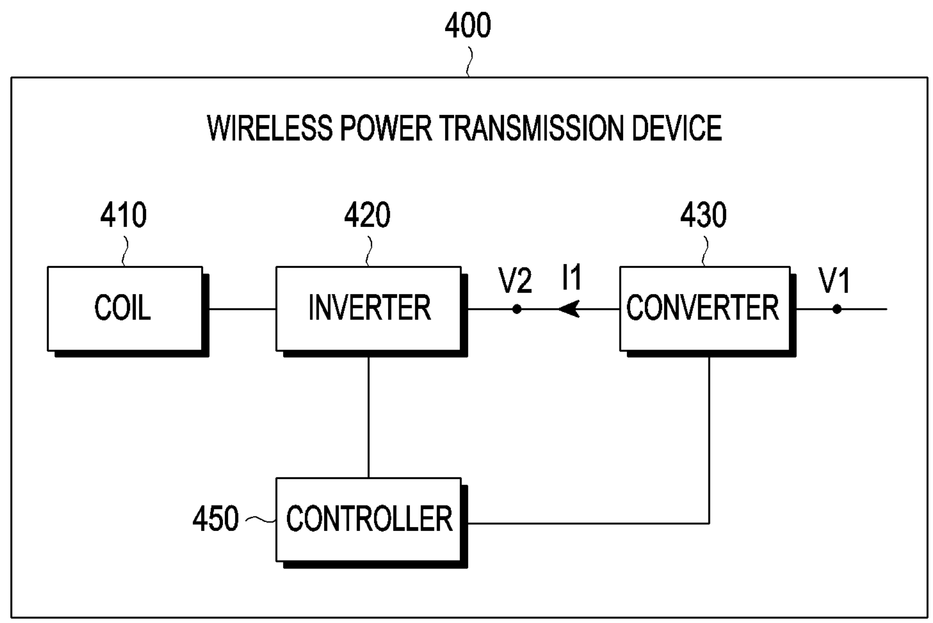
FIG. 4 is a block diagram illustrating a wireless power transmission device included in a wireless power transmission system, according to an embodiment of the disclosure.

FIG. 4 is a block diagram illustrating a wireless power transmission device included in a wireless power transmission system, according to an embodiment of the disclosure. FIG. 4 may be described with reference to FIG. 5.

Figure 5:
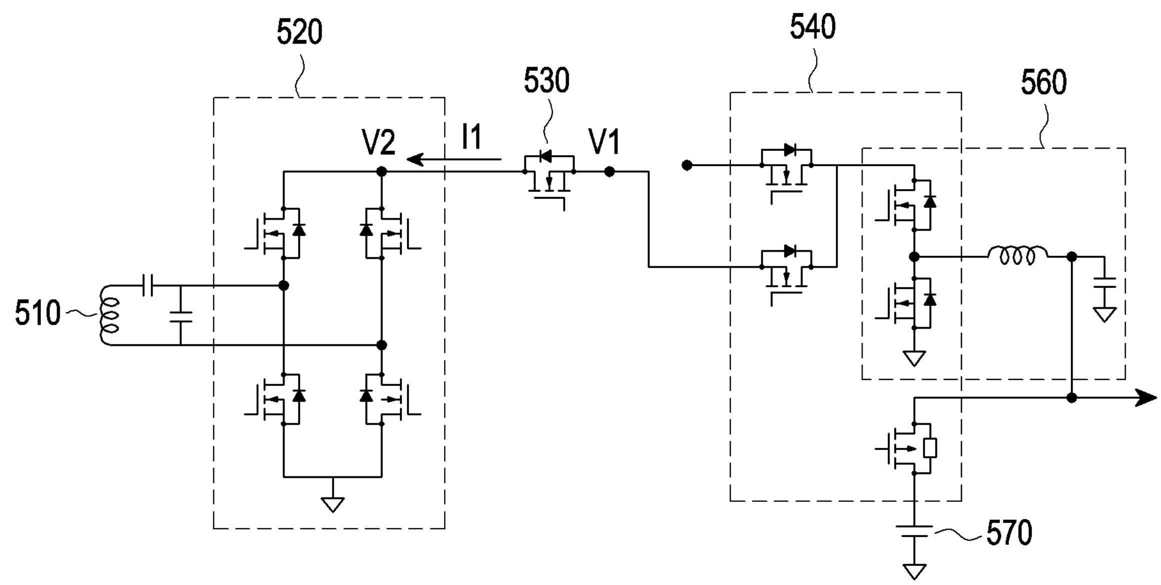
FIG. 5 is a view illustrating a wireless power transmission device included in a wireless power transmission system according to an embodiment of the disclosure.

FIG. 5 is a view illustrating a wireless power transmission device included in a wireless power transmission system according to an embodiment of the disclosure.

According to an embodiment, the wireless power transmission device 400 of FIG. 4 may be a device (e.g., the wireless power transmission device 101 of FIG. 1 or the wireless power transmission device 210 of FIG. 2) operating only as a wireless power transmission device, or may be a device (e.g., the electronic device 230 of FIG. 2 or the electronic device 301 of FIG. 3) capable of operating both as a wireless power transmission device or a wireless power reception device.

In the embodiments of FIGS. 4 to 10, a case may be described in which the wireless power transmission device 400 operates only as a wireless power transmission device, such as the wireless power transmission device 210 of FIG. 2, or a case in which a device capable of operating as both a wireless power transmission device and a wireless power reception device, such as the electronic device 230 of FIG. 2, operate as a wireless power transmission device.

In the following description, it is not discerned whether the wireless power transmission device 400 is the wireless power transmission device 210 or the electronic device 230. The description of the wireless power transmission device 400 may be applied to both the wireless power transmission device 210 and the electronic device 230 within a range applicable mutatis mutandis.

Referring to FIG. 4, the wireless power transmission device 400 may include a coil 410, an inverter 420, a converter 430, and a controller 450.

Referring to FIG. 5, the wireless power transmission device 400 may include a coil 510, an inverter 520, a converter 530, a power management integrated circuit (PMIC) 540 (e.g., an interface PMIC), a charger circuit 560, and a battery 570.

According to an embodiment, the coil 410 of FIG. 4 may be the coil 510 of FIG. 5. The inverter 420 of FIG. 4 may be the inverter 520 of FIG. 5. The converter 430 of FIG. 4 may be the converter 530 of FIG. 5. The controller 450 of FIG. 4 may be a micro controlling unit (MCU), a field programmable gate array (FPGA), an application specific integrated circuit (ASIC), a microprocessor, or an application processor (AP).

The converter 430 may be a DC-DC conversion circuit. For example, the converter 430 may be configured to perform a DC/DC power conversion operation. According to an embodiment, the converter 430 may operate as a transmission converter. The transmission converter may be a converter used for an operation related to transmission of wireless power when the wireless power transmission device 400 transmits wireless power. For example, power provided by a power source of the wireless power transmission device 400 may be provided to the converter 430. The power source may include at least one of an interface for connection with an external travel adapter (TA), a battery 570 of the wireless power transmission device 400, a charger (e.g., the charger circuit 560), or a power management integrated circuit (PMIC) (e.g., the PMIC 540). The power source may provide, e.g., DC power to the converter 430, but the type of power provided is not limited. The converter 430 may convert the voltage of the received power and provide the converted voltage to the inverter 420. The converter 430 may change the voltage of the received DC power and provide the DC power having the changed voltage (or driving voltage) to the inverter 420. According to an embodiment, the converter 430 may perform low drop-output (LDO) conversion. According to an embodiment, at least a portion of the PMIC 540 or the charger circuit 560 may perform buck conversion and/or boost conversion, and may include, e.g., a 3-level converter. According to an embodiment, the converter 430 may be implemented as the converter 530 of FIG. 5 operating as a switch. The switch may be a linear regulator that operates even at a low input/output potential difference between two opposite ends of the switch. The switch may include a diode and a transistor (e.g., a field effect transistor (FET)). According to an embodiment, the current (e.g., I1) flowing through the converter 430 (e.g., the converter 530 of FIG. 5) may be identified based on the input/output voltages V1 and V2 (e.g., the input/output voltages V1 and V2 of the converter 530 of FIG. 5) of the converter 430 and the internal resistance Ron (e.g., the internal resistance Ron of the converter 530 of FIG. 5) of the converter 430. For example, the input voltage V1 of the converter 430 may be a voltage supplied from an external travel adapter (TA) or the PMIC 540. According to an embodiment, the wireless power transmission device 400 may identify the current (e.g., I1) flowing through the converter 430 (e.g., the converter 530 of FIG. 5), thereby identifying the current input to the inverter 420 (e.g., the inverter 520 of FIG. 5). In various embodiments described below, the operation of comparing the current (e.g., I1) flowing through the converter 430 (e.g., the converter 530 of FIG. 5) with a reference value may be an operation of comparing the current input to the inverter 420 (e.g., the inverter 520 of FIG. 5) through the converter 430 (e.g., the converter 530 of FIG. 5) with a reference value. According to an embodiment, the converter 430 may operate as a reception converter. The reception converter may be a converter used for an operation related to reception of wireless power when the wireless power transmission device 400 (e.g., the electronic device 230) receives wireless power. According to an embodiment, at least a portion of the PMIC 540 or the charger circuit 560 may include a converter operating as a reception converter.

According to an embodiment, the charger circuit 560 may perform boost conversion to supply power to the inverter. According to an embodiment, the charger circuit 560 may perform a primary conversion operation, and the converter 530 may perform a secondary conversion operation. The inverter 420 may be an AC-DC conversion circuit. For example, the inverter 420 may be configured to perform an AC/DC power conversion operation. The inverter 420 may be connected to the converter 430. According to an embodiment, when the wireless power transmission device 400 transmits wireless power, the inverter 420 may operate as an inverter that converts direct current into alternating current. For example, AC power may be output using the driving voltage provided from the converter 430. The plurality of switches included in the inverter 420 may constitute, e.g., a full bridge circuit, but the number of switches or the type of bridge circuit is not limited. For example, when a full bridge circuit is configured, one end of the coil 410 may be connected to a connection point between a pair of switches through a capacitor, and the other end of the coil 410 may be connected to a connection point between the other pair of switches. A plurality of switches (e.g., the first switch, the second switch, the third switch, and the fourth switch) included in the inverter 420 may be controlled in an on state or an off state. For example, in order to generate AC power, the controller 450 may control the first switch and the third switch in the on state while controlling the second switch and the fourth switch in the off state during a first period, and may control the second switch and the fourth switch in the on state while controlling the first switch and the third switch in the off state during a second period, and may repeatedly perform the above-described control operations. The controller 450 may provide a control signal for generating the above-described AC power to the plurality of switches included in the inverter 420. Here, not only outputting the control signal but also refraining from outputting the control signal may also be referred to as control of the controller 450. For example, outputting the first control signal for generating AC power having a first frequency to the inverter 420 may mean that the controller 450 outputs a control signal for controlling the first switch and the second switch in the on state for a period corresponding to the first frequency, then outputs a control signal for controlling a second frequency and a fourth frequency in the on state for a period corresponding to the first frequency, and repeats the above-described output operations. Meanwhile, outputting the second control signal for generating the AC power having the second frequency to the inverter 420 may mean that the controller 450 outputs a control signal control signal for controlling the first switch and the second switch in the on state for the period corresponding to the second frequency, then outputs a control signal control signal for controlling the second switch and the fourth switch in the on state for the period corresponding to the second frequency, and repeats the above-described output operations. In this case, the period corresponding to the second frequency may be different from the period corresponding to the first frequency. At least one of the converter 430 or the inverter 420 may be referred to as a power providing circuit. The controller 450 may control the power providing circuit (e.g., at least one of the converter 430 or the inverter 420) so that power is applied to the coil 410. According to an embodiment, when the wireless power transmission device 400 (e.g., the electronic device 230) receives wireless power, the inverter 420 may operate as a rectifying circuit that converts AC into DC.

According to an embodiment, AC power generated by the inverter 420 may be applied to the coil 410. The coil 410 may be connected to the inverter 420. The coil 410, together with a capacitor, may form a resonant circuit. The coil 410 may form a magnetic field based on the applied AC power. A portion of the magnetic field (or magnetic flux) formed by the transmission coil 213 may pass through a cross section of the reception coil of the wireless power reception device (e.g., the wireless power reception device 220). As the magnetic field passing through the cross section of the reception coil changes over time, an induced electromotive force (e.g., current, voltage, or power) may be generated in the reception coil.

According to an embodiment, the wireless power transmission device 400 may include a demodulation circuit. The demodulation circuit may demodulate a signal (e.g., a voltage applied to two opposite ends of the coil 410) applied to the coil 410 to output a demodulation signal. The demodulation circuit may output, e.g., a demodulation signal by down-converting the signal (e.g., the voltage across two opposite ends) applied to the coil 410 by the frequency (e.g., 100 kHz to 210 kHz) of AC power. For example, the demodulation circuit may include a mixer and/or a multiplier circuit for removing a carrier component (e.g., 100 kHz to 210 kHz, which is the frequency of AC power) for wireless power transmission. Here, since the waveform in which the component by modulation of the wireless power reception device (e.g., the wireless power reception device 220) and the AC power component by the wireless power transmission device 400 are mixed may be applied to two opposite ends of the coil 410 of the wireless power transmission device 400, the frequency component (e.g., 100 to 210 kHz) of the AC power is referred to as the carrier component, and it will be understood by one of ordinary skill in the art that the wireless power reception device (e.g., the wireless power reception device 220) does not actually generate the electromagnetic wave obtained by mixing the modulated data with the carrier. Accordingly, the carrier component (e.g., 100 kHz to 210 kHz, which is the frequency of AC power) may be removed from the voltage between the two opposite ends of the coil 410. The demodulation circuit may additionally filter (low pass filtering) and output the demodulation signal. The demodulation circuit may include a low-pass filter. Alternatively, the demodulation circuit may generate the demodulation signal by filtering the voltage between the two opposite ends of the coil 410 and then down-converting it by the frequency (e.g., 100 kHz to 210 kHz) of the AC power. The amplitude of voltage between the two opposite ends of the coil 410 may be changed according to ASK modulation of the wireless power reception device (e.g., the wireless power reception device 220). According to an embodiment, the controller 450 may identify information provided by the wireless power reception device (e.g., the wireless power reception device 220) based on the demodulation signal output by the demodulation circuit. The controller 450 may perform, e.g., analog-to-digital conversion (ADC) on the demodulation signal. The controller 450 may decode the digital value obtained as a result of the ADC, and may identify information provided by the wireless power reception device (e.g., the wireless power reception device 220) according to the decoding result. It will be appreciated by one of ordinary skill in the art that the decoding scheme may follow, e.g., the Qi standard, but is not limited. Meanwhile, in the above-described embodiment, it has been described that the demodulation circuit performs frequency down-conversion (e.g., carrier removal) and/or low-pass filtering, and the controller 450 performs ADC and/or decoding, but this is merely an example. According to an embodiment, it will be understood by one of ordinary skill in the art that the demodulation circuit may be implemented to further perform at least one of ADC or decoding, or according to another embodiment, the controller 450 may be implemented to further perform frequency down-conversion (e.g., carrier removal) and/or low-pass filtering.

Figure 6:
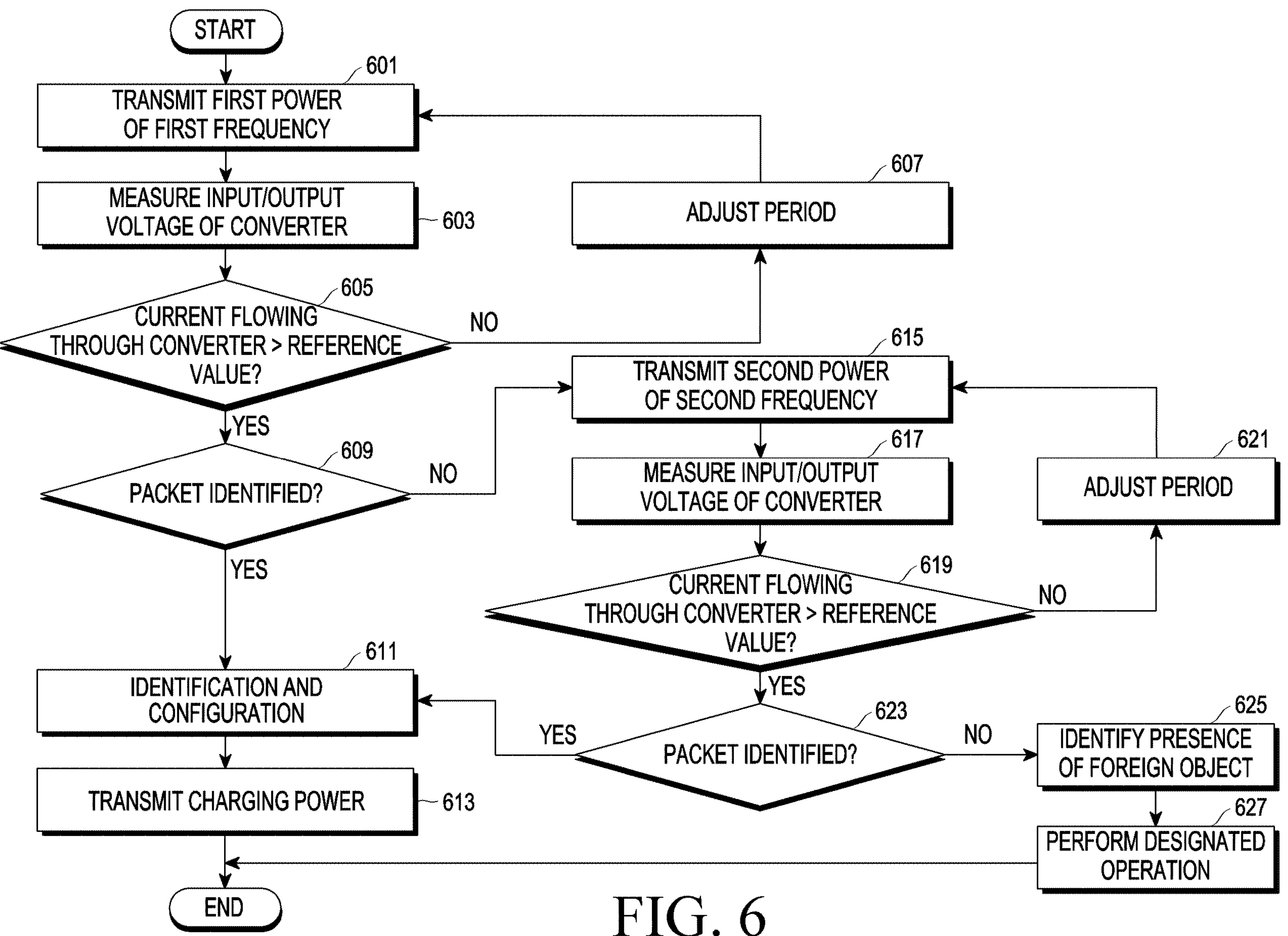
FIG. 6 is a flowchart illustrating a method for operating a wireless power transmission device included in a wireless power transmission system, according to an embodiment of the disclosure.

FIG. 6 is a flowchart illustrating a method for operating a wireless power transmission device included in a wireless power transmission system according to an embodiment of the disclosure. FIG. 6 is described with reference to FIG. 4.

Power transmitted while operations 601, 603, 605, 607, and 609 are performed may be referred to as "first power" (or a first type ping signal). The first power may be power in which the frequency of the first power is included in a "first frequency range" in which the lower limit of the frequency range exceeds a reference value (e.g., a reference frequency). The "reference value" may be a reference value (e.g., a reference frequency) of the frequency of wireless power transmitted from the wireless power transmission device 400, which is determined to maintain the voltage at a specific point inside the wireless power reception device (e.g., the wireless power reception device 220) below a predetermined level when wireless power transmitted from the wireless power transmission device 400 is transmitted to an external wireless power reception device (e.g., the wireless power reception device 220). For example, when the frequency of the transmitted power is included in the first frequency range, the transmitted power may be referred to as first power. For example, even if the frequency of the transmitted power is changed according to the time point, if the frequency of the transmitted power during the first period continues to be included in the first frequency range, the first period may be referred to as the period during which the first power is transmitted. When the wireless power transmission device 400 performs a specific operation while the first power is transmitted, it may mean that the frequency of the power transmitted from the wireless power transmission device 400 continues to be included in the first frequency range while performing the specific operation. According to an embodiment, while operations 601, 603, 605, 607, and 609 are performed, not only the first power but also other power may be transmitted.

The power transmitted while operations 615, 617, 619, 621, and 623 are performed may be referred to as "second power" (or a second type ping signal). The second power may be power in which the frequency of the second power is included in a "second frequency range" in which the upper limit of the frequency range is less than or equal to a reference value (e.g., a reference frequency). For example, when the frequency of the transmitted power is included in the second frequency range, the transmitted power may be referred to as second power. The description of the case where the frequency of the second power is changed may be understood similarly to the description of the case where the frequency of the first power is changed. According to an embodiment, while operations 615, 617, 619, 621, and 623 are performed, not only the second power but also other power may be transmitted.

Referring to FIG. 6, in operation 601, according to an embodiment, the wireless power transmission device 400 (e.g., the controller 450) may control the inverter 420 to transmit the first power of the first frequency (e.g., 148 kHz) through the coil 410. According to an embodiment, the first frequency may exceed the reference frequency. According to an embodiment, the first frequency range may be included in the first frequency range. An embodiment in which the frequency of the first power is changed will be further described with reference to FIGS. 7 and 8.

In operation 603, according to an embodiment, the wireless power transmission device 400 may measure the input/output voltage of the converter 430. For example, the wireless power transmission device 400 may measure a first voltage at a first end (e.g., the input end) of the converter 430 and a second voltage at a second end (e.g., the output end) of the converter 430 while the first power is transmitted. The "first voltage" may be a voltage measured at the first end (e.g., the input end) of the converter 430 while the first power is transmitted. For example, measuring the first voltage may be measuring the voltage at the first end (e.g., the input end) of the converter 430 at a specific time point in the period when the first power is transmitted, or continuously or periodically measuring the voltage at the first end (e.g., the input end) of the converter 430 while the first power is transmitted. The "second voltage" may be a voltage measured at the second end (e.g., the output end) of the converter 430 while the first power is transmitted. According to an embodiment, the wireless power transmission device 400 may measure the first voltage and the second voltage during a designated period (e.g., a measurement period). For example, the wireless power transmission device 400 may measure the first voltage and the second voltage once every designated cycle (e.g., measurement cycle) (e.g., once every ms) during a designated period (e.g., measurement period) (e.g., 80 ms to 600 ms). According to an embodiment, the wireless power transmission device 400 may previously store information about the designated period (e.g., the measurement period) and/or the designated cycle (e.g., the measurement cycle). According to an embodiment, the wireless power transmission device 400 may determine the designated period (e.g., the measurement period) and/or the designated cycle (e.g., the measurement cycle) according to information identified by the wireless power transmission device 400. According to an embodiment, the wireless power transmission device 400 may change the designated period (e.g., the measurement period) and/or the designated cycle (e.g., the measurement cycle). For example, while transmitting the first power, the wireless power transmission device 400 may measure the first voltage and the second voltage once every first cycle during the first period, and after adjusting the period in operation 607, the wireless power transmission device 400 may measure the first voltage and the second voltage once every first cycle during the second period (e.g., a second period longer than the first period) different from the first period. For example, while transmitting the first power, the wireless power transmission device 400 may adjust a designated period (e.g., a measurement period) according to operation 607 to measure the first voltage and the second voltage once every second cycle (e.g., a second cycle longer than the first period) different from the first cycle during the designated period (e.g., the measurement period) increased over time. For example, when performing operation 603 for the first time, the wireless power transmission device 400 may perform operation 603 for the shortest designated period (e.g., the measurement period) (e.g., 80 ms), and may then perform operation 603 for the increased designated period (e.g., the measurement period) as the designated period (e.g., the measurement period) is adjusted according to operation 607.

In operation 605, according to an embodiment, the wireless power transmission device 400 may compare the current flowing through the converter 430, calculated based on the first voltage, the second voltage, and the internal resistance Ron of the converter 430, with a reference value. For example, the current may be input to the inverter 420 through the converter 430. For example, the current flowing through the converter 430 may be a current input to the inverter 420. For example, the wireless power transmission device 400 may compare the current flowing through the converter 430 with the reference value, thereby comparing the current input to the inverter 420 with the reference value. The description of the current flowing through the converter 430 and the current input to the inverter 420 may be applied to various embodiments of various drawings. According to an embodiment, the wireless power transmission device 400 may previously store information about the reference value. According to an embodiment, the wireless power transmission device 400 may determine the reference value according to information identified by the wireless power transmission device 400. According to an embodiment, the wireless power transmission device 400 may change the reference value. The wireless power transmission device 400 may perform operation 607 based on the current flowing through the converter 430 being less than or equal to the reference value while the first power is transmitted. The wireless power transmission device 400 may perform operation 609 based on the current flowing through the converter 430 exceeding the reference value while the first power is transmitted. According to an embodiment, the wireless power transmission device 400 may identify that a metal material is present on (or around) the wireless power transmission device 400, based on the current flowing through the converter 430 exceeding the reference value while the first power is transmitted. An embodiment of comparing an average of currents flowing through the converter 430 while the first power is transmitted with a reference value will be further described with reference to FIG. 8.

In operation 607, according to an embodiment, the wireless power transmission device 400 may adjust a period (e.g., a measurement period) and/or a designated cycle (e.g., a measurement cycle) for measuring the input/output voltage of the converter 430, based on the current flowing through the converter 430 being equal to or less than a reference value. For example, the wireless power transmission device 400 may adjust the period (e.g., the measurement period) for measuring the input/output voltage of the converter 430 based on the current flowing through the converter 430 being equal to or less than the reference value during the designated period (e.g., the measurement period) of operation 603 while the first power is transmitted. As another example, the wireless power transmission device 400 may adjust a period (e.g., a measurement period) and a designated cycle (e.g., a measurement cycle) for measuring the input/output voltage of the converter 430 based on the current flowing through the converter 430 being equal to or less than the reference value during the designated period (e.g., the measurement period) of operation 603 while the first power is transmitted. As another example, the wireless power transmission device 400 may adjust the designated cycle (e.g., the measurement cycle) for measuring the input/output voltage of the converter 430 based on the current flowing through the converter 430 being equal to or less than the reference value during the designated period (e.g., the measurement period) of operation 603 while the first power is transmitted. For example, the wireless power transmission device 400 may adjust the period (e.g., the measurement period) for measuring the input/output voltage of the converter 430 to a second period longer than the existing first period, based on the current flowing through the converter 430 being less than or equal to the reference value. For example, the wireless power transmission device 400 may adjust the period (e.g., the measurement period) for measuring the input/output voltage of the converter 430 to the second period longer than the first period, based on the current flowing through the converter 430 during the first period being less than or equal to the reference value while the first power is transmitted. For example, the wireless power transmission device 400 may adjust the measurement period to a period longer than the existing period by a preset size. According to an embodiment, the wireless power transmission device 400 may stop transmitting the first power based on the current flowing through the converter 430 during the measurement period (e.g., the maximum period) (e.g., 600 ms) being less than or equal to the reference value, based on the designated period (e.g., the measurement period) being adjusted to reach the maximum period according to operation 607. For example, the wireless power transmission device 400 may perform another operation without stopping transmission of the first power, based on the current flowing through the converter 430 during the measurement period (e.g., the maximum period) (e.g., 600 ms) being less than or equal to the reference value.

In operation 609, according to an embodiment, the wireless power transmission device 400 may identify whether a packet from the outside is identified, based on the current flowing through the converter 430 exceeding the reference value while the first power is transmitted. The "packet" may be data provided by a wireless power reception device (e.g., the wireless power reception device 220). A method for identifying a packet using a demodulation circuit by the wireless power transmission device 400 has been described above. For example, the wireless power transmission device 400 may identify whether a packet (e.g., a signal strength packet (SSP)) from the wireless power reception device (e.g., the wireless power reception device 220) is identified, based on the current flowing through the converter 430 exceeding the reference value. The wireless power transmission device 400 may perform operation 611 based on the packet being identified while the first power is transmitted. The wireless power transmission device 400 may perform operation 615 based on the packet not being identified while the first power is transmitted.

In operation 611, according to an embodiment, while power (e.g., the first power or the second power to be described below) is transmitted, the wireless power transmission device 400 may perform an identification and configuration operation, based on the packet being identified. The identification and configuration operation may be an operation in which the wireless power transmission device 400 identifies and configures a relationship with the wireless power reception device (e.g., the wireless power reception device 220) in order to transmit charging power to the wireless power reception device (e.g., the wireless power reception device 220). The wireless power transmission device 400 may identify the presence of a wireless power reception device (e.g., the wireless power reception device 220) based on a packet being identified while power (e.g., the first power or the second power to be described below) is transmitted, and may perform an identification and configuration operation.

In operation 613, according to an embodiment, the wireless power transmission device 400 may perform an identification and configuration operation and may transmit charging power. The charging power may be power for charging the wireless power reception device (e.g., the wireless power reception device 220).

In operation 615, according to an embodiment, the wireless power transmission device 400 may control the inverter 420 to transmit the second power of the second frequency (e.g., a frequency lower than the frequency of the first power in operation 601) (e.g., 113 kHz) through the coil 410, based on the packet not being identified while the first power is transmitted in operation 609. According to an embodiment, the second frequency may be less than or equal to the reference frequency. According to an embodiment, the second frequency may be included in the second frequency range. An embodiment in which the frequency of the second power is changed may be understood similarly to an embodiment in which the frequency of the first power is changed in FIGS. 7 and 8.

In operation 617, according to an embodiment, the wireless power transmission device 400 may measure the input/output voltage of the converter 430. For example, the wireless power transmission device 400 may measure a third voltage at a first end (e.g., the input end) of the converter 430 and a fourth voltage at a second end (e.g., the output end) of the converter 430 while the second power is transmitted. The "third voltage" may be distinguished from the "first voltage" and may be a voltage measured at the first end (e.g., the input end) of the converter 430 while the second power is transmitted. The "fourth voltage" may be distinguished from the "second voltage" and may be a voltage measured at the second end (e.g., the output end) of the converter 430 while the second power is transmitted. According to an embodiment, the wireless power transmission device 400 may measure the third voltage and the fourth voltage during a designated period (e.g., the measurement period). For example, the wireless power transmission device 400 may measure the third voltage and the fourth voltage once every designated cycle (e.g., the measurement cycle) (e.g., once every ms) during the designated period (e.g., the measurement period) (e.g., 80 ms to 600 ms). According to an embodiment, the wireless power transmission device 400 may previously store information about the designated period (e.g., the measurement period) and/or the designated cycle (e.g., the measurement cycle). According to an embodiment, the wireless power transmission device 400 may determine the designated period (e.g., the measurement period) and/or the designated cycle (e.g., the measurement cycle) according to information identified by the wireless power transmission device 400. According to an embodiment, the wireless power transmission device 400 may change the designated period (e.g., the measurement period) and/or the designated cycle (e.g., the measurement cycle). For example, while transmitting the second power, the wireless power transmission device 400 may measure the third voltage and the fourth voltage once every first cycle during the first period, and then in operation 621, after adjusting the period, the wireless power transmission device 400 may measure the third voltage and the fourth voltage once every first cycle during the second period (e.g., a second period longer than the first period) different from the first period. For example, while transmitting the second power, the wireless power transmission device 400 may adjust a designated period (e.g., a measurement period) according to operation 621 and measure the third voltage and the fourth voltage once every second cycle (e.g., the second period longer than the first period) different from the first cycle during the designated period (e.g., the measurement period) increased over time. For example, when performing operation 617 for the first time, the wireless power transmission device 400 may perform operation 617 for the shortest designated period (e.g., the measurement period) (e.g., 80 ms), and may then perform operation 617 for the increased designated period (e.g., the measurement period) as the designated period (e.g., the measurement period) is adjusted according to operation 621. The description of the designated period (e.g., the measurement period) and the designated cycle (e.g., the measurement cycle) of operation 617 may be understood similarly to the description of the designated period (e.g., the measurement period) and the designated cycle (e.g., the measurement cycle) of operation 603. According to an embodiment, the ranges of the designated period (e.g., the measurement period) and the designated cycle (e.g., the measurement cycle) of operation 617 may be the same as or different from the ranges of the designated period (e.g., the measurement period) and the designated cycle (e.g., the measurement cycle) of operation 603.

In operation 619, according to an embodiment, the wireless power transmission device 400 may compare the current flowing through the converter 430, calculated based on the third voltage, the fourth voltage, and the internal resistance Ron of the converter 430, with a reference value. The description of the reference value in operation 619 may be understood similarly to the description of the reference value in operation 605. According to an embodiment, the reference value of operation 619 may be the same as or different from the reference value of operation 605. The wireless power transmission device 400 may perform operation 621 based on the current flowing through the converter 430 being less than or equal to the reference value while the second power is transmitted. The wireless power transmission device 400 may perform operation 623 based on the current flowing through the converter 430 exceeding the reference value while the second power is transmitted. According to an embodiment, the wireless power transmission device 400 may identify that a metal material is present on (or around) the wireless power transmission device 400, based on the current flowing through the converter 430 exceeding the reference value while the second power is transmitted. An embodiment of comparing the average of the currents flowing through the converter 430 while the second power is transmitted with the reference value may be understood similarly to an embodiment of comparing the average of the currents flowing through the converter 430 while the first power is transmitted with the reference value in FIG. 8.

In operation 621, according to an embodiment, the wireless power transmission device 400 may adjust a period (e.g., a measurement period) and/or a designated cycle (e.g., a measurement cycle) for measuring the input/output voltage of the converter 430, based on the current flowing through the converter 430 being equal to or less than a reference value. For example, the wireless power transmission device 400 may adjust the period (e.g., the measurement period) for measuring the input/output voltage of the converter 430 based on the current flowing through the converter 430 being equal to or less than the reference value during the designated period (e.g., the measurement period) of operation 617 while the second power is transmitted. As another example, the wireless power transmission device 400 may adjust the period (e.g., the measurement period) and the designated cycle (e.g., the measurement cycle) for measuring the input/output voltage of the converter 430 based on the current flowing through the converter 430 being equal to or less than the reference value during the designated period (e.g., the measurement period) of operation 617 while the second power is transmitted. As another example, the wireless power transmission device 400 may adjust the designated period (e.g., the measurement period) for measuring the input/output voltage of the converter 430 based on the current flowing through the converter 430 being equal to or less than the reference value during the designated period (e.g., the measurement period) of operation 617 while the second power is transmitted. Operation 621 may be understood similarly to operation 607, and the omitted portion of the description of operation 621 may be understood with reference to the description of operation 607.

In operation 623, according to an embodiment, the wireless power transmission device 400 may identify whether a packet from the outside is identified, based on the current flowing through the converter 430 exceeding the reference value while the second power is transmitted. Operation 623 may be understood similarly to operation 609, and the omitted portion of the description of operation 623 may be understood with reference to the description of operation 609. The wireless power transmission device 400 may perform operation 611 based on the packet being identified while the second power is transmitted. The wireless power transmission device 400 may perform operation 625 based on the packet not being identified while the second power is transmitted.

In operation 625, according to an embodiment, the wireless power transmission device 400 may identify the presence of a foreign object on the wireless power transmission device 400, based on the packet not being identified while the second power is transmitted. The foreign object may be a device or material other than a wireless power reception device (e.g., the wireless power reception device 220).

In operation 627, according to an embodiment, the wireless power transmission device 400 may perform a designated operation upon identifying the presence of a foreign object on the wireless power transmission device 400. For example, the wireless power transmission device 400 may stop transmitting power (e.g., the second power) according to identifying the presence of a foreign object. For example, according to identifying the presence of the foreign object, the wireless power transmission device 400 may perform a designated operation of indicating the presence of the foreign object. For example, according to identifying the presence of the foreign object, the wireless power transmission device 400 may perform a designated operation of indicating the presence of the foreign object through an output device (e.g., a screen output device, a sound output device, a vibration output device, a light output device, or a wireless signal output device) of the wireless power transmission device 400. For example, the wireless power transmission device 400 may display a designated screen on the display of the wireless power transmission device 400 according to identifying the presence of a foreign object. For example, according to identifying the presence of the foreign object, the wireless power transmission device 400 may transmit a signal indicating the presence of the foreign object to the outside. For example, a wireless power reception device (e.g., the wireless power reception device 220) positioned on (or around) the wireless power transmission device 400 may perform a designated operation, based on the signal indicating the presence of a foreign object received from the wireless power transmission device 400. For example, the wireless power transmission device 400 may enable the wireless power reception device (e.g., the wireless power reception device 220) positioned on (or around) the wireless power transmission device 400 to perform a designated operation by transmitting the signal indicating the presence of the foreign object to the outside according to identifying the presence of the foreign object.

FIG. 6 illustrates that, after transmitting the first power of the first frequency, if a predetermined condition is met, the second power of the second frequency lower than the first frequency is transmitted, but this is merely an example. According to an embodiment, after operation 623, third power of a third frequency lower than the second frequency may be transmitted instead of operation 625, and the number of repetitions of the operation is not limited. For example, the wireless power transmission device 400 may identify whether the current flowing through the converter 430 exceeds the reference value and identify whether a packet from the outside is identified, while changing (e.g., decreasing or increasing) the frequency of the transmitted power by a designated unit (e.g., in units of 5 kHz). For example, the wireless power transmission device 400 may transmit power while changing the frequency in the order of 148 KHz, 143 kHz, 138 kHz, 133 kHz, 128 kHz, 123 kHz, 118 kHz, and 113 kHz, and while transmitting power of each frequency, the wireless power transmission device 400 may identify whether the current flowing through the converter 430 exceeds the reference value and identify whether a packet from the outside is identified. For example, the wireless power transmission device 400 may transmit power of 138 kHz based on no packet from the outside being identified while transmitting power of 148 kHz, may transmit power of 133 kHz based on no packet from the outside being identified while transmitting power of 138 kHz, and may repeat the same to perform operation 625 based on no packet from the outside being identified while transmitting power of 113 kHz.

Figure 7:
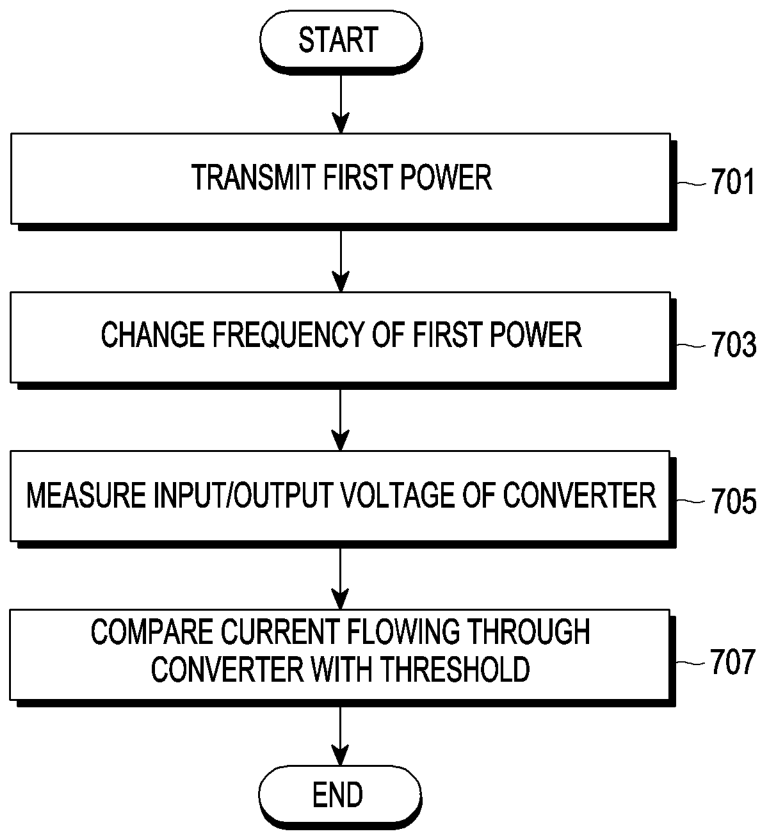
FIG. 7 is a flowchart illustrating a method for operating a wireless power transmission device included in a wireless power transmission system, according to an embodiment of the disclosure.

FIG. 7 is a flowchart illustrating a method for operating a wireless power transmission device included in a wireless power transmission system, according to an embodiment of the disclosure. FIG. 7 is described with reference to FIG. 4.

Referring to FIG. 7, an embodiment in which the frequency of the first power is changed in operation 601 of FIG. 6 may be understood. FIG. 7 illustrates an embodiment in which the frequency of the first power is changed, but referring to the embodiment of FIG. 7, an embodiment in which the frequency of the second power is changed in operation 615 of FIG. 6 may also be understood.

Referring to FIG. 7, in operation 701, according to an embodiment, the wireless power transmission device 400 (e.g., the controller 450) may control the inverter 420 to transmit the first power through the coil 410. As described with reference to FIG. 6, the "first power" may be power in which the frequency of the first power is included in the "first frequency range" in which the lower limit of the frequency range exceeds the reference value (e.g., the reference frequency).

In operation 703, according to an embodiment, the wireless power transmission device 400 may control the inverter 420 to change (e.g., decrease or increase) the frequency of the first power transmitted through the coil 410. For example, the wireless power transmission device 400 may control the inverter 420 so that the frequency of the first power is lowered by a designated magnitude within the first frequency range. For example, the wireless power transmission device 400 may control the inverter 420 so that the frequency of the first power is decreased by a designated magnitude (e.g., 5 kHz) from a designated frequency (e.g., 148 kHz). For example, the wireless power transmission device 400 may control the inverter 420 so that the frequency of the first power is decreased by a designated magnitude (e.g., 5 kHz) from a designated frequency (e.g., 148 kHz) to a designated frequency (e.g., 133 kHz). According to an embodiment, the wireless power transmission device 400 may control the inverter 420 to increase the frequency of the first power transmitted through the coil 410.

According to an embodiment, similar to operations 701 and 703, while the second power is transmitted, the wireless power transmission device 400 may control the inverter 420 to change (e.g., decrease or increase) the frequency of the second power transmitted through the coil 410. For example, the wireless power transmission device 400 may control the inverter 420 so that the frequency of the second power is decreased from a designated frequency (e.g., 128 kHz) by a designated magnitude (e.g., 5 kHz). For example, the wireless power transmission device 400 may control the inverter 420 so that the frequency of the second power is decreased by a designated magnitude (e.g., 5 kHz) from a designated frequency (e.g., 128 kHz) to a designated frequency (e.g., 113 kHz). According to an embodiment, the wireless power transmission device 400 may control the inverter 420 to increase the frequency of the second power transmitted through the coil 410.

In operation 705, according to an embodiment, the wireless power transmission device 400 may measure the input/output voltage of the converter 430 while the frequency of the first power is changed (e.g., decreased or increased) within the first frequency range. For example, while the frequency of the first power is decreased within the first frequency range, the wireless power transmission device 400 may measure a first voltage at a first end (e.g., the input end) of the converter 430 and a second voltage at a second end (e.g., the output end) of the converter 430. According to an embodiment, the cycle when the frequency of the first power is changed and the cycle when the input/output voltage of the converter 430 is measured may be the same or different.

In operation 707, according to an embodiment, the wireless power transmission device 400 may compare a reference value with the current flowing through the converter 430 while the frequency of the first power is changed (e.g., decreased or increased) within the first frequency range. For example, while the frequency of the first power is decreased within the first frequency range, the wireless power transmission device 400 may compare the reference value with the current flowing through the converter 430, calculated based on the first voltage, the second voltage, and the internal resistance Ron of the converter 430.

According to an embodiment, the wireless power transmission device 400 may perform operation 607 of FIG. 6, based on the current flowing through the converter 430 being equal to or less than the reference value while the frequency of the first power is decreased within the first frequency range. Thereafter, according to an embodiment, operation 701, operation 703, operation 705, and operation 707 may be repeatedly performed on the first power.

According to an embodiment, while the frequency of the first power is decreased within the first frequency range, the wireless power transmission device 400 may identify whether a packet from the outside is identified, based on the current flowing through the converter 430 being larger than the reference value, and may perform operation 611 or 615 of FIG. 6, based on whether the packet is identified.

According to an embodiment, similar to operations 705 and 707, the reference value may be compared with the current flowing through the converter 430 while the frequency of the second power is changed (e.g., decreased or increased) within the second frequency range.

According to an embodiment, the wireless power transmission device 400 may perform operation 621 of FIG. 6, based on the current flowing through the converter 430 being equal to or less than the reference value while the frequency of the second power is decreased within the second frequency range. Thereafter, according to an embodiment, operations similar to operations 701, 703, 705, and 707 may be repeatedly performed on the second power.

According to an embodiment, while the frequency of the second power is decreased within the second frequency range, the wireless power transmission device 400 may identify whether a packet from the outside is identified, based on the current flowing through the converter 430 being larger than the reference value, and may perform operation 611 or 625 of FIG. 6, based on whether the packet is identified.

Figure 8:
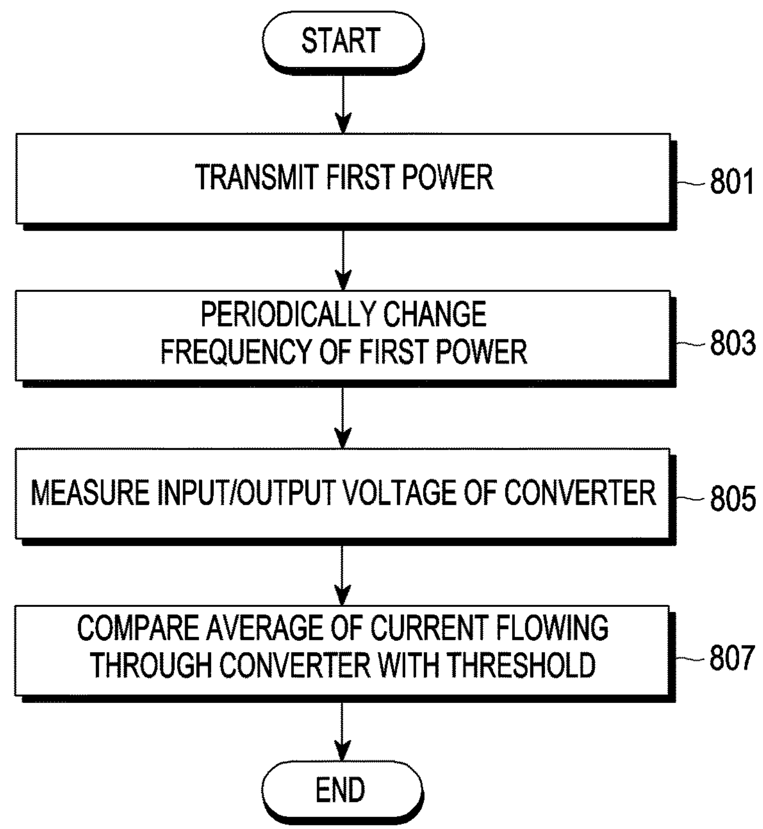
FIG. 8 is a flowchart illustrating a method for operating a wireless power transmission device included in a wireless power transmission system, according to an embodiment of the disclosure.

FIG. 8 is a flowchart illustrating a method for operating a wireless power transmission device included in a wireless power transmission system, according to an embodiment of the disclosure. FIG. 8 is described with reference to FIG. 4.

Referring to FIG. 8, in operation 605 of FIG. 6, an embodiment may be understood in which an average of currents flowing through the converter 430 while the first power is transmitted is compared with the reference value. FIG. 8 illustrates an embodiment of comparing an average of currents flowing through the converter 430 while the first power is transmitted with the reference value. However, referring to the embodiment of FIG. 8, an embodiment of comparing an average of currents flowing through the converter 430 while the second power is transmitted with the reference value in operation 619 of FIG. 6 may also be understood.

Referring to FIG. 8, in operation 801, according to an embodiment, the wireless power transmission device 400 (e.g., the controller 450) may control the inverter 420 to transmit the first power through the coil 410. Operation 801 may be understood in a similar manner to operation 701.

In operation 803, according to an embodiment, the wireless power transmission device 400 may control the inverter 420 to change (e.g., decrease or increase) the frequency of the first power transmitted through the coil 410. Operation 803 may be understood in a similar manner to operation 703.

According to an embodiment, similar to operations 801 and 803, while the second power is transmitted, the wireless power transmission device 400 may control the inverter 420 to change (e.g., decrease or increase) the frequency of the second power transmitted through the coil 410.

In operation 805, according to an embodiment, the wireless power transmission device 400 may measure the input/output voltage of the converter 430 while the frequency of the first power is changed (e.g., decreased or increased) within the first frequency range. Operation 805 may be understood in a similar manner to operation 705.

In operation 807, according to an embodiment, the wireless power transmission device 400 may compare the average of the currents flowing through the converter 430 with the reference value while the frequency of the first power is changed (e.g., decreased or increased) within the first frequency range. For example, while the frequency of the first power is decreased within the first frequency range, the wireless power transmission device 400 may compare the average of the currents flowing through the converter 430, calculated based on the first voltage, the second voltage, and the internal resistance Ron of the converter 430, with the reference value.

According to an embodiment, while the frequency of the first power is decreased within the first frequency range, the wireless power transmission device 400 may perform operation 607 of FIG. 6, based on the average of currents flowing through the converter 430 being equal to or less than the reference value. Thereafter, according to an embodiment, operation 801, operation 803, operation 805, and operation 807 may be repeatedly performed on the first power.

According to an embodiment, while the frequency of the first power is decreased within the first frequency range, the wireless power transmission device 400 may identify whether a packet from the outside is identified, based on the average of currents flowing through the converter 430 being larger than the reference value, and may perform operation 611 or 615 of FIG. 6, based on whether the packet is identified.

According to an embodiment, similar to operations 805 and 807, while the frequency of the second power is changed (e.g., decreased or increased) within the second frequency range, the average current flowing through the converter 430 may be compared with the reference value.

According to an embodiment, while the frequency of the second power is decreased within the second frequency range, the wireless power transmission device 400 may perform operation 621 of FIG. 6, based on the average of currents flowing through the converter 430 being equal to or less than the reference value. Thereafter, according to an embodiment, operations similar to operations 801, 803, 805, and 807 may be repeatedly performed on the second power.

According to an embodiment, while the frequency of the second power is decreased within the second frequency range, the wireless power transmission device 400 may identify whether a packet from the outside is identified, based on the average of currents flowing through the converter 430 being larger than the reference value, and may perform operation 611 or operation 625 of FIG. 6, based on whether the packet is identified.

Figure 9:
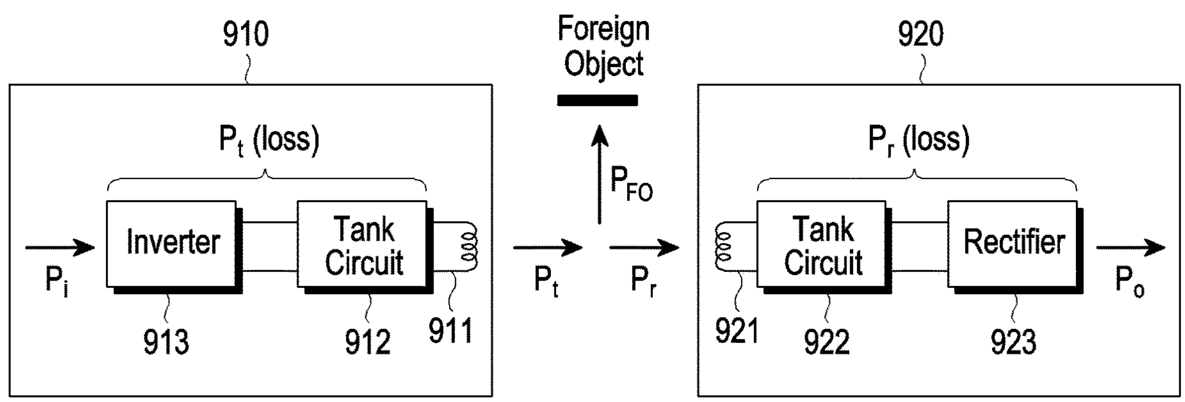
FIG. 9 is a view illustrating operations of a wireless power transmission device included in a wireless power transmission system, according to an embodiment of the disclosure.

FIG. 9 is a view illustrating operations of a wireless power transmission device included in a wireless power transmission system, according to an embodiment of the disclosure. FIG. 9 is described with reference to FIG. 4.

Referring to FIG. 9, an embodiment in which the wireless power transmission device 400 controls transmission of charging power based on power loss may be understood.

The wireless power transmission device 910 (e.g., the wireless power transmission device 400) on the left side of FIG. 9 includes a coil 911, a tank circuit 912 including a capacitor, and an inverter 913. The wireless power reception device 920 (e.g., the wireless power reception device 220) on the right side of FIG. 9 includes a coil 921, a tank circuit 922 including a capacitor, and a rectifier 923.

According to an embodiment, the wireless power transmission device 910 (e.g., the wireless power transmission device 400) may identify power loss. For example, the wireless power transmission device 910 (e.g., the wireless power transmission device 400) may identify power loss while operation 613 is performed or after operation 613 is performed. For example, the wireless power transmission device 910 (e.g., the wireless power transmission device 400) may identify power loss before performing operation 613.

Referring to FIG. 9, according to an embodiment, the wireless power transmission device 910 (e.g., the wireless power transmission device 400) may identify the power loss $P_{loss}$ (or the power Pro absorbed by the external object) based on the transmitted power $P_t$ of the wireless power transmission device 910 (e.g., the wireless power transmission device 400) and the received power $P_r$ of the wireless power reception device 920 (e.g., the wireless power reception device 220). According to an embodiment, the wireless power transmission device 910 (e.g., the wireless power transmission device 400) may identify the power loss $P_{loss}$ (or the power $P_{FO}$ absorbed by the external object), based on the input power $P_i$ of the inverter 913 of the wireless power transmission device 910 (e.g., the wireless power transmission device 400) and the power loss $P_i$(loss) of the inverter 913 and the tank circuit 912, the output power $P_o$ of the rectifier 923 of the wireless power reception device 920 (e.g., the wireless power reception device 220), and the power loss $P_r$(loss) of the rectifier 923 and the tank circuit 922.

According to an embodiment, the wireless power transmission device 910 (e.g., the wireless power transmission device 400) may receive a first received power packet RP1 from the wireless power reception device 920 (e.g., the wireless power reception device 220). Based on the reception of the first received power packet RP1, the wireless power transmission device 910 (e.g., the wireless power transmission device 400) may enter a calibration phase. However, according to implementation, the wireless power transmission device 910 (e.g., the wireless power transmission device 400) may receive the first received power packet after entering the calibration phase. Further, the calibration phase may be understood as a part of the power transfer phase.

According to an embodiment, the wireless power reception device 920 (e.g., the wireless power reception device 220) may report information about the strength of the received power to the wireless power transmission device 910 (e.g., the wireless power transmission device 400) in a plurality of load states (e.g., a light load state and a heavy load state) in the calibration phase. Here, the load states may be divided based on the level of the current input to the load of the wireless power reception device 920 (e.g., the wireless power reception device 220) (or the level of the current output from the rectifier and/or the converter). A state in which the level of the current input to the load is relatively small may be referred to as a light state, and a state in which the level of the current input to the load is relatively large may be referred to as a heavy state, but such naming is merely an example.

According to an embodiment, the wireless power reception device 920 (e.g., the wireless power reception device 220) may transmit the first received power packet PRI including the received power level in a first load state. The wireless power reception device 920 (e.g., the wireless power reception device 220) may identify the received power level based on the level of the received power and transmit, e.g., modulate, a first received power packet PRI including the power level. Here, the received power level is a value according to, e.g., the Qi standard and may be a received power value or an estimated received power value.

The received power level may be obtained as a result of processing (e.g., processing as defined in the Qi standard) the power level (e.g., in watts) measured (or estimated) by the wireless power reception device 920 (e.g., the wireless power reception device 220) but, without limitations thereto, the measured (or estimated) power level itself may be implemented. The first received power packet RP1 is for indicating a first calibration data point, and the received power level included in the first received power packet RP1 may be not more than 10% of the reference power level included in the power transfer contract. The first received power packet may have, e.g., a type value of "1" (e.g., 001), and the wireless power transmission device (e.g., the wireless power transmission device 400) may identify that the first received power packet RP1 is received based on the type value of "1." The wireless power transmission device 910 (e.g., the wireless power transmission device 400) may receive a second received power packet RP2 from the wireless power reception device 920 (e.g., the wireless power reception device 220) while the power is applied. The wireless power reception device 920 (e.g., the wireless power reception device 220) may transmit the second received power packet RP2 including the received power level in a second load state. The second received power packet RP2 may be for indicating a second calibration data point (or its subsequent data point) and may be a value close to the reference power level included in the power transmission contract. The second received power packet may have, e.g., a type value of "2," and the wireless power transmission device 910 (e.g., the wireless power transmission device 400) may identify that the second received power packet RP2 is received based on the type value of "2" (e.g., 010).

According to various embodiments, the wireless power transmission device 910 (e.g., the wireless power transmission device 400) may calculate a parameter based on the values of two calibration data points. The two calibration data points are merely an example, and there is no limit to the number of them. For example, the wireless power transmission device 910 (e.g., the wireless power transmission device 400) may identify the transmitted power level ($P_{transmitted}^1$) and received power level ($P_{received}^1$) in the first load state and the transmitted power level ($P_{transmitted}^2$) and received power level ($P_{received}^2$) in the second load state (e.g., a connected load state). The wireless power transmission device 910 (e.g., the wireless power transmission device 400) may identify the slope (a) based on the interpolation as illustrated in Equation 1 and may identify the intercept (b) as illustrated in Equation 2.

$$a = \frac{P_{received}^2 - P_{received}^1}{P_{transmitted}^2 - P_{transmitted}^1} \quad \text{Equation 1}$$

$$b = \frac{P_{transmitted}^2 \cdot P_{received}^1 - P_{received}^2 \cdot P_{transmitted}^1}{P_{transmitted}^2 - P_{transmitted}^1} \quad \text{Equation 2}$$

According to an embodiment, the wireless power transmission device 910 (e.g., the wireless power transmission device 400) may enter a power transfer phase and apply power for charging after identifying parameters. The wireless power reception device 920 (e.g., the wireless power reception device 220) may identify the power Ptransmitted transmitted in the power transfer phase and calibrate the same, as in Equation 3, into the power Pcalibrated.

$$P_{calibrated} = a \cdot P_{transmitted} + b \quad \text{Equation 3}$$

Further, the wireless power transmission device 910 (e.g., the wireless power transmission device 400) may identify the power loss Ploss based on Equation 4.

$$P_{loss} = P_{calibrated} - P_{received} \quad \text{Equation 4}$$

Preceived in Equation 4 may be the reception power level in the wireless power reception device 920 (e.g., the wireless power reception device 220) identified based on in-band communication from the wireless power reception device 920 (e.g., the wireless power reception device 220). The wireless power transmission device 910 (e.g., the wireless power transmission device 400) may determine whether a foreign object is placed while power transmission is underway based on whether the power loss Ploss is greater than or equal to a preset reference value. Alternatively, the wireless power transmission device 910 (e.g., the wireless power transmission device 400) may calculate the power loss using the result of performing calibration on the strength of the received power. Meanwhile, the above-described method for obtaining parameters (e.g., a and b) for a linear model based on the two calibration data is merely an example. Alternatively, the wireless power transmission device 910 (e.g., the wireless power transmission device 400) may identify the calibration curve by processing (e.g., interpolating) a plurality of calibration data. The wireless power transmission device 910 (e.g., the wireless power transmission device 400) may identify an effective foreign object detection (FOD) threshold from the calibration curve. The wireless power transmission device 910 (e.g., the wireless power transmission device 400) may detect a foreign object based on whether the result of subtracting the received power level from the level of the transmitted power is greater than the effective FOD threshold. According to an embodiment, the wireless power transmission device 910 (e.g., the wireless power transmission device 400) may determine whether a foreign object is placed during the power transfer phase based on the power for charging in the power transfer phase, the received power level included in the received power packet (e.g., RP 0), and at least one parameter. According to an embodiment, the wireless power transmission device 910 (e.g., the wireless power transmission device 400) may control the transmission of charging power depending on whether a foreign object is placed.

Figure 10:
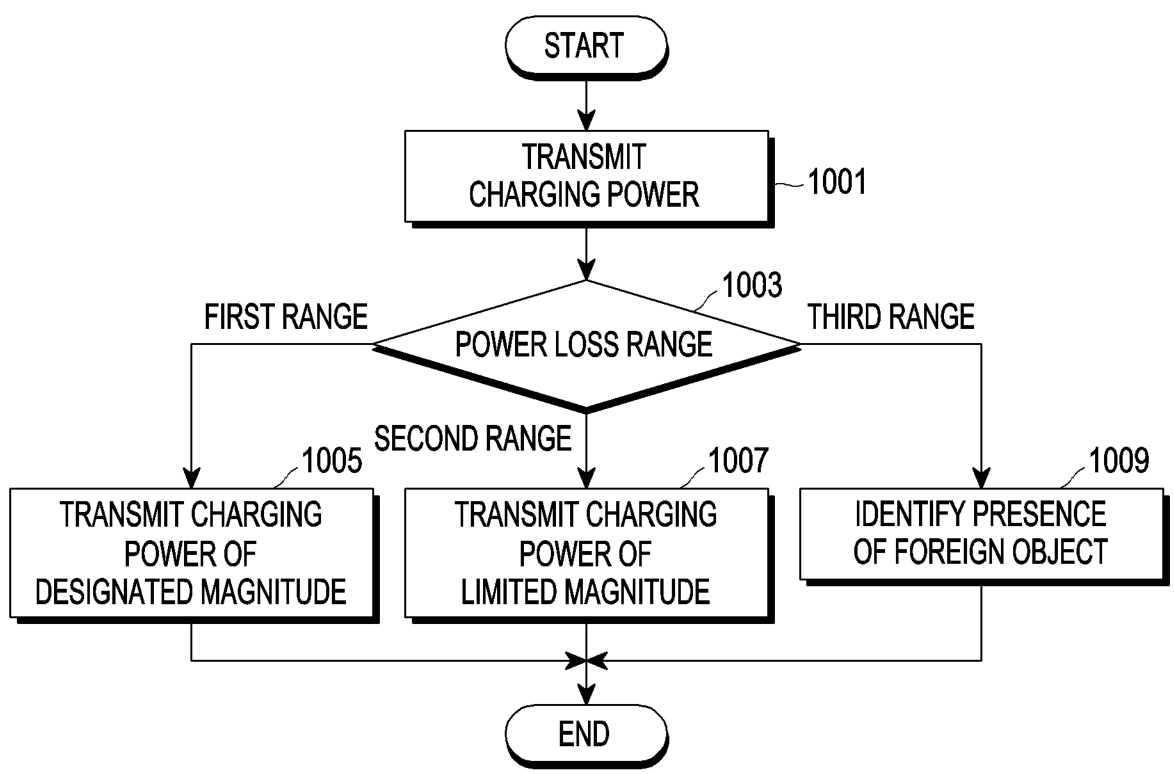
FIG. 10 is a flowchart illustrating a method for operating a wireless power transmission device included in a wireless power transmission system, according to an embodiment of the disclosure.

FIG. 10 is a flowchart illustrating a method for operating a wireless power transmission device included in a wireless power transmission system, according to an embodiment of the disclosure. FIG. 10 is described with reference to FIG. 4.

Referring to FIG. 10, in operation 1001, according to an embodiment, the wireless power transmission device 400 (e.g., the controller 450) may transmit charging power. Operation 1001 may be operation 613 of FIG. 6.

In operation 1003, according to an embodiment, after transmitting the charging power, the wireless power transmission device 400 may determine a range of power loss. Determining the power loss range may be determining the magnitude of the power loss of FIG. 9. The wireless power transmission device 400 may perform operation 1005 based on the power loss being included in the first range. The wireless power transmission device 400 may perform operation 1007 based on the power loss being included in a second range higher than the first range. The wireless power transmission device 400 may perform operation 1009 based on the power loss being included in a third range higher than the second range. When the second range is higher than the first range, the lower limit of the second range may be higher than the upper limit of the first range.

In operation 1005, according to an embodiment, the wireless power transmission device 400 may control the inverter 420 so that charging power having a designated magnitude is transmitted through the coil 410, based on the power loss being included in the first range.

In operation 1007, according to an embodiment, based on the power loss being included in the second range higher than the first range, the wireless power transmission device 400 may control the inverter 420 so that charging power having a limited magnitude smaller than a designated magnitude is transmitted through the coil 410.

In operation 1009, according to an embodiment, the wireless power transmission device 400 may identify the presence of a foreign object on the wireless power transmission device 400, based on the power loss being included in the third range higher than the second range. For example, the wireless power transmission device 400 may identify that a foreign object (or a foreign object and a wireless power reception device (e.g., the wireless power reception device 220)) is present on (or around) the wireless power transmission device 400, based on the power loss being included in the third range higher than the second range. According to an embodiment, the wireless power transmission device 400 may perform a designated operation based on identifying the presence of a foreign object by operation 1009. For example, the wireless power transmission device 400 may stop transmitting power (e.g., charging power) according to identifying the presence of a foreign object. For example, according to identifying the presence of the foreign object, the wireless power transmission device 400 may perform a designated operation of indicating the presence of the foreign object. For example, according to identifying the presence of the foreign object, the wireless power transmission device 400 may perform a designated operation of indicating the presence of the foreign object through an output device (e.g., a screen output device, a sound output device, a vibration output device, a light output device, or a wireless signal output device) of the wireless power transmission device 400. For example, the wireless power transmission device 400 may display a designated screen on the display of the wireless power transmission device 400 according to identifying the presence of a foreign object. For example, according to identifying the presence of the foreign object, the wireless power transmission device 400 may transmit a signal indicating the presence of the foreign object to the outside. For example, a wireless power reception device (e.g., the wireless power reception device 220) positioned on (or around) the wireless power transmission device 400 may perform a designated operation, based on the signal indicating the presence of a foreign object received from the wireless power transmission device 400. For example, the wireless power transmission device 400 may enable the wireless power reception device (e.g., the wireless power reception device 220) positioned on (or around) the wireless power transmission device 400 to perform a designated operation by transmitting the signal indicating the presence of the foreign object to the outside according to identifying the presence of the foreign object. According to an embodiment, the wireless power transmission device 400 may perform a designated operation of indicating that a foreign object and a wireless power reception device (e.g., the wireless power reception device 220) are present on (or around) the wireless power transmission device 400.

According to an embodiment, the wireless power transmission device 400 may identify whether a foreign object is present on (or around) the wireless power transmission device 400, whether a foreign object and a wireless power reception device (e.g., the wireless power reception device 220) are present, or whether a wireless power reception device (e.g., the wireless power reception device 220) is present, by performing the operations included in the embodiments of FIGS. 6 to 8 and/or the operations included in the embodiments of FIGS. 9 and 10. According to an embodiment, the wireless power transmission device 400 may perform a designated operation of indicating the presence of the foreign object, based on identifying that only the foreign object is present on (or around) the wireless power transmission device 400. According to an embodiment, the wireless power transmission device 400 may perform a designated operation of indicating the presence of the foreign object and the wireless power reception device (e.g., the wireless power reception device 220) based on identifying that the foreign object and the wireless power reception device (e.g., the wireless power reception device 220) are present on (or around) the wireless power transmission device 400.

It may be understood by one of ordinary skill in the art that embodiments described herein may be applied mutually organically within the applicable scope. For example, one of ordinary skill in the art may understand that at least some operations of an embodiment of the disclosure may be omitted and applied and that at least some operations of an embodiment and at least some operations of another embodiment may be organically combined and applied.

According to an embodiment, a wireless power transmission device (e.g., the wireless power transmission device 400) may comprise a converter (e.g., the converter 430) configured to perform a DC/DC power conversion operation, an inverter (e.g., the inverter 420) connected to the converter and configured to perform an AC/DC power conversion operation, a coil (e.g., the coil 410) connected to the inverter, and a controller (e.g., the controller 450). The controller may be configured to control an inverter of the wireless power transmission device to transmit first power of a first frequency through a coil of the wireless power transmission device, compare a first current input to the inverter through the converter with a reference value while the first power is transmitted, identify whether a packet from an outside is identified based on the first current being larger than the reference value, control the inverter to transmit second power of a second frequency lower than the first frequency through the coil based on the packet not being identified while the first power is transmitted, compare a second current input to the inverter through the converter with the reference value while the second power is transmitted, identify whether the packet is identified based on the second current being larger than the reference value, and identify that a foreign object is present, based on the packet not being identified while the second power is transmitted.

According to an embodiment, the controller may be configured to, while the first power is transmitted, measure a first voltage at a first end of the converter and a second voltage at a second end of the converter, and compare a threshold voltage with the first current calculated based on the first voltage, the second voltage, and an internal resistance of the converter.

According to an embodiment, the first frequency may exceed a reference frequency, and the second frequency may be equal to or less than the reference frequency.

According to an embodiment, the first frequency may be included in a first frequency range in which a lower limit of a frequency range exceeds the reference frequency. The controller may be configured to control the inverter so that a frequency of the first power is decreased by a designated magnitude from the first frequency to a third frequency included in the first frequency range, and compare the first current with the reference value while the frequency of the first power is decreased from the first frequency to the third frequency.

According to an embodiment, while the frequency of the first power is decreased from the first frequency to the third frequency, the controller may be configured to compare the first current with the reference value, identify whether the packet is identified based on the first current being larger than the reference value, and control the inverter so that the second power of the second frequency is transmitted through the coil, based on the packet not being identified.

According to an embodiment, while the frequency of the first power is decreased from the first frequency to the third frequency, the controller may be configured to calculate an average of the first current, identify whether the packet is identified based on the average of the first current being larger than the reference value, and control the inverter so that the second power of the second frequency is transmitted through the coil, based on the packet not being identified.

According to an embodiment, while the first power is transmitted, the controller may be configured to compare the first current with the reference value once every first cycle during a first period, and compare the first current with the reference value once every first cycle during a second period longer than the first period, based on the first current being equal to or less than the reference value during the first period.

According to an embodiment, the packet may be a signal strength packet (SSP).

According to an embodiment, the controller may be configured to stop transmitting power and perform a designated operation of indicating a presence of the foreign object, based on determining that the foreign object is present.

According to an embodiment, the controller may be configured to control the inverter to transmit charging power to the outside through the coil, based on the packet being identified while the first power is transmitted or the packet being identified while the second power is transmitted, identify power loss while the charging power is transmitted, and control transmission of the charging power based on a range of the power loss.

According to an embodiment, the controller may be configured to control the inverter to transmit charging power of a designated magnitude through the coil, based on the power loss being included in a first range; control the inverter to transmit charging power of a limited magnitude through the coil, based on the power loss being included in a second range higher than the first range; and determine that a foreign object and a wireless power reception device (e.g., the wireless power reception device 220) are present around the wireless power transmission device, based on the power loss being included in a third range higher than the second range.

According to an embodiment, a method for operating a wireless power transmission device (e.g., the wireless power transmission device 400) may comprise controlling an inverter (e.g., the inverter 420) of the wireless power transmission device to transmit first power of a first frequency through a coil (e.g., the coil 410) of the wireless power transmission device, comparing a first current input to the inverter through a converter of the wireless power transmission device with a reference value while the first power is transmitted, identifying whether a packet from an outside is identified based on the first current being larger than the reference value; controlling the inverter to transmit second power of a second frequency lower than the first frequency through the coil based on the packet not being identified while the first power is transmitted, comparing a second current input to the inverter through the converter with the reference value while the second power is transmitted, identifying whether the packet is identified based on the second current being larger than the reference value, and identifying that a foreign object is present, based on the packet not being identified while the second power is transmitted.

According to an embodiment, comparing the first current with the reference value may include, while the first power is transmitted, measuring a first voltage at a first end of the converter and a second voltage at a second end of the converter; and comparing a threshold voltage with the first current calculated based on the first voltage, the second voltage, and an internal resistance of the converter.

According to an embodiment, the first frequency may exceed a reference frequency, and the second frequency may be equal to or less than the reference frequency.

According to an embodiment, the first frequency may be included in a first frequency range in which a lower limit of a frequency range exceeds the reference frequency. Controlling the inverter of the wireless power transmission device to transmit the first power may include controlling the inverter so that a frequency of the first power is decreased by a designated magnitude from the first frequency to a third frequency included in the first frequency range. Comparing the first current with the reference value while the first power is transmitted may include comparing the first current with the reference value while the frequency of the first power is decreased from the first frequency to the third frequency.

According to an embodiment, comparing the first current with the reference value may include comparing the first current with the reference value while the frequency of the first power is decreased from the first frequency to the third frequency, identifying whether the packet is identified based on the first current being larger than the reference value may include identifying whether the packet is identified based on the first current being larger than the reference value while the frequency is decreased from the first frequency to the third frequency, and controlling the inverter to transmit the second power of the second frequency through the coil may include controlling the inverter to transmit the second power of the second frequency through the coil based on the packet not being identified while the frequency is decreased from the first frequency to the third frequency.

According to an embodiment, comparing the first current with the reference value may include calculating an average of the first current while the frequency of the first power is decreased from the first frequency to the third frequency, identifying whether the packet is identified based on the first current being larger than the reference value may include identifying whether the packet is identified based on the average of the first current being larger than the reference value while the frequency is decreased from the first frequency to the third frequency, and controlling the inverter to transmit the second power of the second frequency through the coil may include controlling the inverter to transmit the second power of the second frequency through the coil based on the packet not being identified while the frequency is decreased from the first frequency to the third frequency.

According to an embodiment, comparing the first current with the reference value while the first power is transmitted may include comparing the first current with the reference value once every first cycle during a first period, and comparing the first current with the reference value once every first cycle during a second period longer than the first period, based on the first current being equal to or less than the reference value during the first period.

According to an embodiment, the packet may be a signal strength packet (SSP).

According to an embodiment, the method may further comprise stopping transmitting power and performing a designated operation of indicating a presence of the foreign object, based on determining that the foreign object is present.

According to an embodiment, the method may further comprise controlling the inverter to transmit charging power to the outside through the coil, based on the packet being identified while the first power is transmitted or the packet being identified while the second power is transmitted, identifying power loss while the charging power is transmitted, and controlling transmission of the charging power based on a range of the power loss.

According to an embodiment, controlling the transmission of the charging power may include controlling the inverter to transmit charging power of a designated magnitude through the coil, based on the power loss being included in a first range, controlling the inverter to transmit charging power of a limited magnitude through the coil, based on the power loss being included in a second range higher than the first range, and determining that a foreign object and a wireless power reception device (e.g., the wireless power reception device 220) are present around the wireless power transmission device, based on the power loss being included in a third range higher than the second range.

The electronic device according to embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program) including one or more instructions that are stored in a storage medium (e.g., internal memory or external memory) that is readable by a machine (e.g., the wireless power transmission device 100). For example, a processor (e.g., the processor 201) of the machine (e.g., the wireless power transmission device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities. Some of the plurality of entities may be separately disposed in different components. According to embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmission device, comprising:

a converter configured to perform a DC/DC power conversion operation;

an inverter connected to the converter and configured to perform a DC/AC power conversion operation;

a coil connected to the inverter;

memory storing one or more computer programs; and one or more processors communicatively coupled to the converter, the inverter, the coil, and the memory, wherein the one or more computer programs include computer-executable instructions that, when executed by the one or more processors individually or collectively, cause the wireless power transmission device to:

control the inverter to transmit first power of a first frequency through the coil, compare a first current input to the inverter through the converter with a reference value while the first power is transmitted, identify whether a packet from an outside is identified based on the first current being larger than the reference value, control the inverter to transmit second power of a second frequency lower than the first frequency through the coil based on the packet not being identified while the first power is transmitted, compare a second current input to the inverter through the converter with the reference value while the second power is transmitted, identify whether the packet is identified based on the second current being larger than the reference value, and identify that a foreign object is present, based on the packet not being identified while the second power is transmitted.

2. The wireless power transmission device of claim 1, wherein the one or more computer programs further include computer-executable instructions that, when executed by the one or more processors individually or collectively, cause the wireless power transmission device to:

while the first power is transmitted, measure a first voltage at a first end of the converter and a second voltage at a second end of the converter, and compare a threshold voltage with the first current calculated based on the first voltage, the second voltage, and an internal resistance of the converter.

3. The wireless power transmission device of claim 1, wherein the first frequency exceeds a reference frequency, and wherein the second frequency is equal to or less than the reference frequency.

4. The wireless power transmission device of claim 3, wherein the first frequency is included in a first frequency range in which a lower limit of a frequency range exceeds the reference frequency, and wherein the one or more computer programs further include computer-executable instructions that, when executed by the one or more processors individually or collectively, cause the wireless power transmission device to:

control the inverter so that a frequency of the first power is decreased by a designated magnitude from the first frequency to a third frequency included in the first frequency range, and compare the first current with the reference value while the frequency of the first power is decreased from the first frequency to the third frequency.

5. The wireless power transmission device of claim 4, wherein the one or more computer programs further include computer-executable instructions that, when executed by the one or more processors individually or collectively, cause the wireless power transmission device to, while the frequency of the first power is decreased from the first frequency to the third frequency:

compare the first current with the reference value, identify whether the packet is identified based on the first current being larger than the reference value, and control the inverter so that the second power of the second frequency is transmitted through the coil, based on the packet not being identified.

6. The wireless power transmission device of claim 4, wherein the one or more computer programs further include computer-executable instructions that, when executed by the one or more processors individually or collectively, cause the wireless power transmission device to, while the frequency of the first power is decreased from the first frequency to the third frequency:

calculate an average of the first current, identify whether the packet is identified based on the average of the first current being larger than the reference value, and control the inverter so that the second power of the second frequency is transmitted through the coil, based on the packet not being identified.

7. The wireless power transmission device of claim 1, wherein the one or more computer programs further include computer-executable instructions that, when executed by the one or more processors individually or collectively, cause the wireless power transmission device to, while the first power is transmitted:

compare the first current with the reference value once every first cycle during a first period, and compare the first current with the reference value once every first cycle during a second period longer than the first period, based on the first current being equal to or less than the reference value during the first period.

8. The wireless power transmission device of claim 1, wherein the packet is a signal strength packet (SSP).

9. The wireless power transmission device of claim 1, wherein the one or more computer programs further include computer-executable instructions that, when executed by the one or more processors individually or collectively, cause the wireless power transmission device to stop transmitting power and perform a designated operation of indicating a presence of the foreign object, based on determining that the foreign object is present.

10. The wireless power transmission device of claim 1, wherein the one or more computer programs further include computer-executable instructions that, when executed by the one or more processors individually or collectively, cause the wireless power transmission device to:

control the inverter to transmit charging power to the outside through the coil, based on the packet being identified while the first power is transmitted or the packet being identified while the second power is transmitted, identify power loss while the charging power is transmitted, and control transmission of the charging power based on a range of the power loss.

11. The wireless power transmission device of claim 10, wherein the one or more computer programs further include computer-executable instructions that, when executed by the one or more processors individually or collectively, cause the wireless power transmission device to:

control the inverter to transmit charging power of a designated magnitude through the coil, based on the power loss being included in a first range, control the inverter to transmit charging power of a limited magnitude through the coil, based on the power loss being included in a second range higher than the first range, and determine that a foreign object and a wireless power reception device are present around the wireless power transmission device, based on the power loss being included in a third range higher than the second range.

12. A method for operating a wireless power transmission device, the method comprising:

controlling an inverter of the wireless power transmission device to transmit first power of a first frequency through a coil of the wireless power transmission device;

comparing a first current input to the inverter through a converter of the wireless power transmission device with a reference value while the first power is transmitted;

identifying whether a packet from an outside is identified based on the first current being larger than the reference value;

controlling the inverter to transmit second power of a second frequency lower than the first frequency through the coil based on the packet not being identified while the first power is transmitted;

comparing a second current input to the inverter through the converter with the reference value while the second power is transmitted;

identifying whether the packet is identified based on the second current being larger than the reference value; and identifying that a foreign object is present, based on the packet not being identified while the second power is transmitted.

13. The method of claim 12, wherein comparing the first current with the reference value includes:

while the first power is transmitted, measuring a first voltage at a first end of the converter and a second voltage at a second end of the converter; and comparing a threshold voltage with the first current calculated based on the first voltage, the second voltage, and an internal resistance of the converter.

14. The method of claim 12, wherein the first frequency exceeds a reference frequency, and wherein the second frequency is equal to or less than the reference frequency.

15. The method of claim 14, wherein the first frequency is included in a first frequency range in which a lower limit of a frequency range exceeds the reference frequency, wherein controlling the inverter of the wireless power transmission device to transmit the first power includes controlling the inverter so that a frequency of the first power is decreased by a designated magnitude from the first frequency to a third frequency included in the first frequency range, and wherein comparing the first current with the reference value while the first power is transmitted includes comparing the first current with the reference value while the frequency of the first power is decreased from the first frequency to the third frequency.

16. The method of claim 15, wherein the method further comprises, while the frequency of the first power is decreased from the first frequency to the third frequency:

calculating an average of the first current, identifying whether the packet is identified based on the average of the first current being larger than the reference value, and controlling the inverter so that the second power of the second frequency is transmitted through the coil, based on the packet not being identified.

17. The method of claim 12, further comprising, while the first power is transmitted:

comparing the first current with the reference value once every first cycle during a first period, and comparing the first current with the reference value once every first cycle during a second period longer than the first period, based on the first current being equal to or less than the reference value during the first period.

18. The method of claim 12, wherein the packet is a signal strength packet (SSP).

19. One or more non-transitory computer-readable storage media storing one or more computer programs including computer-executable instructions that, when executed by one or more processors of a wireless power transmission device individually or collectively, cause the wireless power transmission device to perform operations, the operations comprising:

controlling an inverter of the wireless power transmission device to transmit first power of a first frequency through a coil of the wireless power transmission device;

comparing a first current input to the inverter through a converter of the wireless power transmission device with a reference value while the first power is transmitted;

identifying whether a packet from an outside is identified based on the first current being larger than the reference value;

controlling the inverter to transmit second power of a second frequency lower than the first frequency through the coil based on the packet not being identified while the first power is transmitted;

comparing a second current input to the inverter through the converter with the reference value while the second power is transmitted;

identifying whether the packet is identified based on the second current being larger than the reference value; and identifying that a foreign object is present, based on the packet not being identified while the second power is transmitted.

20. The one or more non-transitory computer-readable storage media of claim 19, wherein the first frequency exceeds a reference frequency, and wherein the second frequency is equal to or less than the reference frequency.

* * * * *